United States Patent
Hudepohl et al.

(10) Patent No.: US 7,194,599 B2
(45) Date of Patent: Mar. 20, 2007

(54) CONFIGURABLE CO-PROCESSOR INTERFACE

(75) Inventors: Lawrence H Hudepohl, Saratoga, CA (US); Darren M Jones, Los Altos, CA (US); Radhika Thekkath, Palo Alto, CA (US); Franz Treue, Palo Alto, CA (US)

(73) Assignee: MIPS Technologies, Inc., Mountain View, CA (US)

( * ) Notice: Subject to any disclaimer, the term of this patent is extended or adjusted under 35 U.S.C. 154(b) by 0 days.

(21) Appl. No.: 11/380,925

(22) Filed: Apr. 29, 2006

(65) Prior Publication Data

US 2006/0259738 A1 Nov. 16, 2006

Related U.S. Application Data

(62) Division of application No. 09/751,748, filed on Dec. 29, 2000.

(51) Int. Cl.
*G06F 9/38* (2006.01)
(52) U.S. Cl. ......................................... 712/34; 712/234
(58) Field of Classification Search .................. 712/34, 712/234
See application file for complete search history.

(56) References Cited

U.S. PATENT DOCUMENTS

| | | |
|---|---|---|
| 3,473,154 A | 10/1969 | Couleur et al. |
| 3,585,599 A | 6/1971 | Hitt et al. |
| 3,611,300 A | 10/1971 | Aldrich et al. |
| 3,681,534 A | 8/1972 | Burian et al. |
| 3,702,989 A | 11/1972 | Provenzano, Jr. et al. |
| 3,704,363 A | 11/1972 | Salmassy et al. |
| 3,707,725 A | 12/1972 | Dellheim |
| 3,771,131 A | 11/1973 | Ling |
| 3,794,831 A | 2/1974 | Frankeny et al. |

(Continued)

FOREIGN PATENT DOCUMENTS

GB 2329048 3/1999

(Continued)

OTHER PUBLICATIONS

MIPS64 5Kc™ Processor Core Software User's Manual. Revision 2.2 Aug. 11, 2000. Document No. MD00055.

(Continued)

*Primary Examiner*—William M. Treat
(74) *Attorney, Agent, or Firm*—James W. Huffman

(57) ABSTRACT

A configurable coprocessor interface between a central processing unit (CPU) and a coprocessor is provided. The coprocessor interface has an instruction transfer signal group for transferring different instruction types from the CPU to the coprocessor, sequentially or in parallel, a busy signal group, for allowing the coprocessor to signal the CPU that it cannot receive a transfer of one or more of the different instruction types, and an instruction order signal group for indicating to the coprocessor a relative execution order for multiple instructions that are transferred in parallel. In addition, the coprocessor interface includes separate data transfer signal groups for data being transferred from the CPU to the coprocessor, and for data being transferred from the coprocessor to the CPU, along with a data order signal group for indicating a relative order of data (if transferred out-of-order). The interface further includes signal designations which allow for multiple issue groups between the CPU and one or more coprocessors.

3 Claims, 7 Drawing Sheets

U.S. PATENT DOCUMENTS

| | | | |
|---|---|---|---|
| 3,805,038 A | | 4/1974 | Buedel et al. |
| 3,906,454 A | | 9/1975 | Martin |
| 4,205,370 A | | 5/1980 | Hirtle |
| 4,293,925 A | | 10/1981 | Haag et al. |
| 4,423,508 A | | 12/1983 | Shiozaki et al. |
| 4,462,077 A | | 7/1984 | York |
| 4,503,495 A | | 3/1985 | Boudreau |
| 4,511,960 A | | 4/1985 | Boudreau |
| 4,539,682 A | | 9/1985 | Herman et al. |
| 4,553,223 A | | 11/1985 | Bouhelier et al. |
| 4,554,661 A | | 11/1985 | Bannister |
| 4,590,550 A | | 5/1986 | Eilert et al. |
| 4,742,466 A | | 5/1988 | Ochiai et al. |
| 4,783,762 A | | 11/1988 | Inoue et al. |
| 4,835,675 A | | 5/1989 | Kawai |
| 4,894,768 A | | 1/1990 | Iwasaki et al. |
| 4,897,779 A | | 1/1990 | Dickson et al. |
| 4,991,080 A | * | 2/1991 | Emma et al. ............... 712/206 |
| 5,058,114 A | | 10/1991 | Kuboki et al. |
| 5,062,041 A | | 10/1991 | Zuk |
| 5,084,814 A | | 1/1992 | Vaglica et al. |
| 5,150,470 A | | 9/1992 | Hicks et al. |
| 5,274,811 A | | 12/1993 | Borg et al. |
| 5,289,587 A | | 2/1994 | Razban |
| 5,386,503 A | | 1/1995 | Staggs et al. |
| 5,404,470 A | | 4/1995 | Miyake |
| 5,404,560 A | * | 4/1995 | Lee et al. ................... 712/208 |
| 5,434,622 A | | 7/1995 | Lim |
| 5,471,594 A | | 11/1995 | Stone |
| 5,473,754 A | | 12/1995 | Folwell et al. |
| 5,491,793 A | | 2/1996 | Somasundaram et al. |
| 5,533,193 A | | 7/1996 | Roscoe |
| 5,581,691 A | | 12/1996 | Hsu et al. |
| 5,598,421 A | | 1/1997 | Tran et al. |
| 5,621,886 A | | 4/1997 | Alpert et al. |
| 5,625,785 A | | 4/1997 | Miura et al. |
| 5,642,478 A | | 6/1997 | Chen et al. |
| 5,642,479 A | | 6/1997 | Flynn |
| 5,689,636 A | | 11/1997 | Kleber et al. |
| 5,689,694 A | | 11/1997 | Funyu |
| 5,699,529 A | | 12/1997 | Powell et al. |
| 5,715,435 A | | 2/1998 | Ikei |
| 5,724,505 A | | 3/1998 | Argade et al. |
| 5,748,904 A | | 5/1998 | Huang et al. |
| 5,751,942 A | | 5/1998 | Christensen et al. |
| 5,751,996 A | | 5/1998 | Glew et al. |
| 5,752,013 A | | 5/1998 | Christensen et al. |
| 5,764,885 A | | 6/1998 | Sites et al. |
| 5,790,561 A | | 8/1998 | Borden et al. |
| 5,802,272 A | | 9/1998 | Sites et al. |
| 5,812,868 A | | 9/1998 | Moyer et al. |
| 5,832,515 A | | 11/1998 | Ledain et al. |
| 5,848,264 A | | 12/1998 | Baird et al. |
| 5,878,208 A | | 3/1999 | Levine et al. |
| 5,923,893 A | | 7/1999 | Moyer et al. |
| 5,944,841 A | | 8/1999 | Christie |
| 5,946,486 A | | 8/1999 | Pekowski |
| 5,956,479 A | | 9/1999 | McInerney et al. |
| 5,970,246 A | | 10/1999 | Moughani et al. |
| 5,978,937 A | | 11/1999 | Miyamori et al. |
| 5,983,338 A | | 11/1999 | Moyer et al. |
| 5,996,092 A | | 11/1999 | Augsburg et al. |
| 6,009,270 A | | 12/1999 | Mann |
| 6,012,085 A | | 1/2000 | Yohe et al. |
| 6,032,268 A | | 2/2000 | Swoboda et al. |
| 6,061,473 A | | 5/2000 | Chen et al. |
| 6,094,729 A | | 7/2000 | Mann |
| 6,106,573 A | | 8/2000 | Mahalingaiah et al. |
| 6,145,123 A | | 11/2000 | Torrey et al. |
| 6,157,977 A | | 12/2000 | Sherlock et al. |
| 6,192,491 B1 | | 2/2001 | Cashman et al. |
| 6,205,506 B1 | | 3/2001 | Richardson |
| 6,256,777 B1 | | 7/2001 | Ackerman |
| 6,282,701 B1 | | 8/2001 | Wygodny et al. |
| 6,314,530 B1 | | 11/2001 | Mann |
| 6,338,159 B1 | | 1/2002 | Alexander, III et al. |
| 6,343,358 B1 | | 1/2002 | Jaggar et al. |
| 6,353,924 B1 | | 3/2002 | Ayers et al. |
| 6,457,144 B1 | | 9/2002 | Eberhard |
| 6,467,083 B1 | | 10/2002 | Yamashita |
| 6,480,952 B2 | | 11/2002 | Gorishek et al. |
| 6,487,715 B1 | | 11/2002 | Chamdani et al. |
| 6,505,290 B1 | | 1/2003 | Moyer et al. |
| 6,516,408 B1 | | 2/2003 | Abiko et al. |
| 6,530,076 B1 | | 3/2003 | Ryan et al. |
| 6,559,850 B1 | | 5/2003 | Strongin et al. |
| 6,615,370 B1 | | 9/2003 | Edwards et al. |
| 6,615,371 B2 | | 9/2003 | McCullough et al. |
| 6,622,225 B1 | | 9/2003 | Kessler et al. |
| 6,658,649 B1 | | 12/2003 | Bates et al. |
| 6,671,793 B1 | | 12/2003 | Swaney et al. |
| 6,684,348 B1 | | 1/2004 | Edwards et al. |
| 6,687,865 B1 | | 2/2004 | Dervisoglu et al. |
| 6,754,804 B1 | | 6/2004 | Hudepohl et al. |
| 2001/0032305 A1 | | 10/2001 | Barry |
| 2001/0054175 A1 | | 12/2001 | Watanabe |
| 2002/0046393 A1 | | 4/2002 | Leino et al. |
| 2002/0147965 A1 | | 10/2002 | Swaine et al. |
| 2005/0038975 A1 | | 2/2005 | Hudepohl et al. |

FOREIGN PATENT DOCUMENTS

| | | |
|---|---|---|
| GB | 2329049 | 3/1999 |

OTHER PUBLICATIONS

MIPS Technologies, Inc. MIPS64 5Kc™ Processor Core User's Manual. Rev. 1.0.1. Dec. 14, 1999. p. 247-276. MIPS Technologies, Inc. Mountain View, CA, USA.

Jones, Darren, "Opal Coprocessor Interface User's Manual," Aug. 20, 1999, MIPS Technologies, Inc., Mountain View, CA, USA.

Jones, Darren, "Opal Coprocessor Interface," Jun. 4, 1999, MIPS Technologies, Inc., Mountain View, CA, USA pp. 1-18.

Computer Architecture—A Quantitative Approach, 2nd Edition, John L. Hennessy and David A. Patterson, Morgan Kaufmann Publishers, 1996; pp. 278 and 282-284.

Structured Computer Organization, 2$^{nd}$ Edition, Andrew S. Tanenbaum, Prentice-Hall, Inc., 1984; pp. 10-12.

Motorola, Inc. "MC68020 and MC68EC020 Microprocessors User's Manual, 1st Edition," 1992, pp. 7-10 to 7-14.

Brub, Rolf-Jurgen, RISC, The MIPS-R3000 Family. Berlin and Munich: Siemens Aktiengesselschaft., 1991. pp. 51-65.

Riordan, Tom. MIPS R3010 Floating-point Coprocessor Interface. MIPS Computer Systems, Inc. Oct. 27, 1988.

LR3010 and LR3010A, MIPS Floating-Point Accelerator User's Manual. LSI Logic Corporation. 1991.

LR3000 and LR3000A, MIPS RISC Microprocessor User's Manual. LSI Logic Corporation. 1991. pp. i to 1-16 and 9-1 to 9-10.

R3000A Processor Interface. Preliminary. Mar. 9, 1990.

MIPS Technologies, Inc. MIPS64 5Kc Processor Core Datasheet. Rev. 1.7.4. Dec. 14, 1999. Mountain View, CA.

Faloutsos, Christos et al., "Description and Performance Analysis of Signature File Methods for Office Filing." ACM Transactions on Office Information Systems. Jul. 1987. pp. 237-257.

Embedded Trace Macrocell (Rev 1) Specification, (2000).

Eggers et al. "The Effect of Sharing on the Cache and Bus Performance of Parallel Programs." ACM, pp. 257-270, 1989.

Peir et al. "Improving Cache Performance with Balanced Tag and Data Paths." ACM ASPLOS VII, pp. 268-278. 1996.

Panda et al. "Data and Memory Optimization Techniques for Embedded Systems." ACM TDAES, vol. 6, No. 2, pp. 149-206. Apr. 2001.

Embedded Trace Macrocell Specification, Rev. 0/0a, ARM IHI 0014C, ARM Ltd. (1999).

Eggers, Susan J. et al. "Techniques for Efficient Inline Tracing on a Shared-Memory Multiprocessor." University of Washington. *1990 ACM*, pp. 37-47.

Uhlig, Richard A. et al. "Trace-Driven Memory Simulation: A Survey." Intel Microcomputer Research Lab; University of Michigan, *ACM Computing Surveys*. vol. 29, No. 2, Jun. 1997. pp. 128-170.

Rotenberg, Eric et al. "Trace Processors." University of Wisconsin. 1997 *IEEE Service Center*. 12 pp.

Elnozahy, E.N. "Address Trace Compression Through Loop Detection and Reduction." *1999 ACM* 1-58113-083, pp. 214, 215.

Jones, Darren. *MIPS64™ 5Kc™ Processor Cores User's Manual*. Rev. 1.0, Jul. 4, 1999. pp. 6-1 to 6-26.

Chow, F. et al. "Engineering a RISC Compiler System." . *IEEE COMP-CON*. Mar. 1986. pp. 132-137.

Smith, M.D. "Tracing with Pixie." *Technical Report* CSL-TR-91-497. Stanford University, Computer Systems Laboratory, Nov. 1991. pp. 1-29.

ATOM Reference Manual. *Digital Equipment Corporation*. Massachusetts, Dec. 1993. pp. 1-32.

Srivastava, A. et al. "ATOM: A System for Building Customized Program Analysis Tools." *WRL, Research Report 94/2*, Digital Equipment Corporation. Mar. 1994, pp. 1-23.

ATOM User Manual, Digital Equipment Corporation, Mar. 1994. pp. 1-28.

Cmelik, B. et al. "Shade: A Fast Instruction-Set Simulator for Execution Profiling." *Proceedings of the 1994 ACM SIGMETRICS Conference*. SIGMETRICS, California. May 1994. pp. 128-137.

MIPS64 5Kc™ Processor Core Datasheet. Revision 1.7.5. Aug. 11, 2000.

MIPS64 5Kc™ Processor Core Datasheet. Revision 2.0. Aug. 28, 2000.

MIPS64™ 5Kf™ Processor Core Datasheet. Revision 00.11. Mar. 30, 2001.

MIPS64 5K™ Processor Core Family Integrator's Guide. Revision 02.00 Jan. 15, 2001.

MIPS64 5Kc™ Processor Core Integrator's Guide. Revision 1.2 Aug. 11, 2000..

MIPS Technologies. "Core Coprocessor Interface Specification." Revision 1.11 Mar. 30, 2001.

* cited by examiner

Instruction Transfer-Multiple Issue Groups

Instruction Transfer-COProcessor Busy

From COProcessor Data Transfer

COProcessor Condition Code Check / GPR / exception Found / Instruction Commit

CONFIGURABLE CO-PROCESSOR INTERFACE

CROSS REFERENCE TO RELATED APPLICATIONS

This application is a Divisional of U.S. patent application Ser. No. 09/751,748 filed Dec. 29, 2000.

FIELD OF THE INVENTION

This invention relates in general to the field of computer architecture, and more specifically to a coprocessor interface for communicating between a central processor and one or more co-processing devices.

BACKGROUND OF THE INVENTION

Early microprocessor based systems utilized a central processing unit, or CPU, which executed instructions, one at a time, in the order in which they were presented. These CPU's, due to their relative complexity, and associated cost, were typically designed to have universal application. That is, they were designed as general purpose CPU's.

As the use of general purpose CPU's increased, so did the variety of programs they were called on to execute. In some instances, certain programs ran extremely slow because they required the CPU to perform complex calculations that were really beyond the scope of what it was intended to perform. An example of such calculations included floating point operations, such a multiply, divide, etc.

To assist the CPU in executing such complex calculations, a floating point coprocessor was designed. The floating point coprocessor was essentially a second processor, external to the CPU, that was designed to perform certain complex operations such as a floating point multiply, a floating point divide, etc, albeit much faster than the CPU. In operation, the CPU, when it was asked to perform a complex operation, would pass the operation over to the floating point coprocessor. The coprocessor would complete the task, and pass the results back to the CPU.

Although the development of the floating point coprocessor enhanced the processing speed of certain applications, its cost kept it from being added to all systems. So, many computer systems were designed around a particular CPU (e.g., an 80286), and were designed to accommodate a dedicated floating point coprocessor (e.g., an 80287), but the coprocessor was not provided with the system. If a user of the system executed the types of applications that could take advantage of the coprocessor, for an additional cost, s/he could add the coprocessor to the system.

Thus, while development of the coprocessor enhanced the performance of many CPU based systems, certain design problems arose. The first is that the coprocessor and the general purpose CPU must be tightly integrated, or designed together, to allow them to communicate together effectively. Operationally speaking, the CPU must be able to detect when a program wishes to use the coprocessor, it must pass those instructions over to the coprocessor, it must provide the data to the coprocessor that corresponds to the instructions, and it must be able to receive results back from the coprocessor. In addition, the coprocessor must know whether the CPU has been interrupted by another process, and whether it still requires the result that it is calculating. One skilled in the art will appreciate that many other issues arise relating to the communication that must occur between a CPU and a coprocessor. So, since the CPU and the coprocessor have to be so tightly integrated, most coprocessors that have been designed are typically designed to work with a particular CPU.

A resulting problem that emanates from the tight integration that is required between a CPU and coprocessor is that enhancement in the design of a particular CPU often requires an enhancement (or change) in the design of its associated coprocessor. That is, an older coprocessor will typically not function with a newer CPU, and a newer coprocessor will typically not function with an older CPU. Thus, every time a CPU manufacturer wishes to introduce a new CPU, they must decide whether they want to develop a dedicated coprocessor that will work along with it. A decision to develop a coprocessor is a very costly decision that ultimately must be supported by the marketplace.

In addition, although the above-described history of the floating-point coprocessor provides a basis for understanding that the coprocessor must be designed with a specific CPU in mind, it does not tell the whole story. Modern applications often require complex, time-consuming calculations that are not appropriate either for a CPU, or for a floating-point coprocessor. That is, other types of coprocessor's are required in certain applications, for optimized performance. Such applications include 3-D rendering for graphics applications, audio/signal processing etc. But, graphics coprocessors, audio coprocessors, etc. have to be designed with a particular interface, e.g., AGP, and typically only operate with CPU's that are designed to that interface.

From the viewpoint of a system designer, the task of choosing a particular CPU for a particular task is increasingly difficult. The designer must anticipate the future needs of the system, utilizing existing CPU and coprocessor designs, without being able to select the CPU and its coprocessors separate from one another. That is, a designer may have an application that may be satisfied by a relatively simple CPU, but requires a fairly complex graphics coprocessor. Unfortunately, the complex coprocessor is only compatible with an equally complex (and costly) CPU. And, vice versa.

Therefore, what is needed is a configurable coprocessor interface that allows a variety of CPU's to be easily coupled to a variety of different coprocessors, without requiring that the coprocessors be designed specifically for those CPU's.

What is also needed is a configurable coprocessor interface that allows both forward and backward compatibility between CPU's and coprocessors. That is, a coprocessor interface is desired that allows older, or legacy, coprocessors to be utilized with newer CPU's, and vice versa.

Further, what is needed is a "standardized" coprocessor interface for which CPU's and coprocessors can be designed. Such an interface would allow a system designer to select those specific CPU and coprocessor combinations that provide an optimum solution for the designer's needs, without regard to proprietary interface requirements.

Finally, what is needed is a coprocessor interface that takes advantage of modern processing technology, such as multiple-issue of instructions, out-of-order data transfer, etc., without mandating that such technology exist in every device on the interface.

SUMMARY

The present invention provides a scalable and configurable coprocessor interface that distinguishes between instruction types to be transferred between a central processing unit (CPU) and a coprocessor, to allow for sequential or parallel transfer of differing instruction types, to one or more coprocessor pipelines. In addition, the interface provides separate TO/FROM data buses between the CPU and the coprocessor to allow for simultaneous data transfer (in/out) between the CPU and the coprocessor. The interface further provides for disassociation between instructions that are transferred, and data that is transferred, to allow data to be transferred in variable time slots with respect to their associated instructions. Moreover, the interface allows for out-of-order data transfer, without requiring tags to be associated with each data transfer. Rather, the interface keeps track of the relative order of outstanding instructions that require data for execution, and provides a relative order indicator along with each piece of data as it is transferred. Furthermore, condition code signaling is provided from the coprocessor to allow the coprocessor to evaluate CPU specific conditional instructions, and inform the CPU as to whether it should execute, or not execute, the CPU conditional instructions.

An embodiment of the present invention provides a coprocessor interface between a central processing unit (CPU) and a coprocessor. The interface includes an instruction transfer signal group, and a busy signal group. The instruction transfer signal group transfers different instruction types from the CPU to the coprocessor. The busy signal group is coupled to the instruction transfer signal group, and signals the instruction transfer signal group when one or more of the different instruction types cannot be transferred. When the instruction transfer signal group receives the busy signaling for one or more of the different instruction types, the instruction transfer signal group does not transfer those instruction types, but does transfer others.

In another aspect, the present invention provides a computer program product for use with a computing device. The computer program product includes a computer usable medium, having computer readable program code embodied in the medium, for causing a coprocessor interface to be described. The computer readable program code includes first program code and second program code. The first program code provides an instruction transfer signal group for transferring different instruction types from a CPU to a coprocessor. The second program code provides a busy signal group for signaling the instruction transfer signal group when one or more of the different instruction types cannot be transferred.

In a further aspect, the present invention provides a computer data signal embodied in a transmission medium. The data signal contains computer-readable first program code for providing an instruction transfer signal group for transferring a number of instruction types from a CPU to a coprocessor, and computer-readable second program code for providing a busy signal group for signaling the instruction transfer signal group when one or more of the plurality of instruction types cannot be transferred. When the instruction transfer signal group receives the signaling for one or more of the number of instruction types, the instruction transfer signal group does not transfer those instruction types, but transfers other ones of the number of instruction types.

In yet another aspect, the present invention provides an interface between a central processing unit (CPU) and a coprocessor for transferring data from the CPU to the coprocessor, where the data is transferred out-of-order with respect to its associated instructions. The interface includes a data instruction signal group, a data signal group, and a data order signal group. The data instruction signal group transfers first and second data instructions from the CPU to the coprocessor. The data signal group transfers first and second data, associated with the first and second data instructions, respectively, from the CPU to the coprocessor, out-of-order. The data order signal group indicates to the coprocessor a relative data order of transfer for the first and second data.

In another aspect, the present invention provides an out-of-order data transfer interface between a central processing unit (CPU) and a coprocessor. The interface includes a data instruction signal group, a data signal group, and a data order signal group. The data instruction signal group transfers M data instructions from the CPU to the coprocessor. The data signal group transfers M sets of data from the CPU to the coprocessor. The data order signal group, having $2^N$ distinct signals, indicates to the coprocessor, for each of the M sets of data that are transferred, their relative order of transfer with respect to the M data instructions.

A further aspect of the present invention provides a coprocessor interface for establishing instruction, data, and control communication between a central processing unit (CPU) and a coprocessor. The interface also provides for coprocessor evaluation of CPU conditional instructions. The interface includes an instruction transfer group, and a conditional code signal group. The instruction transfer group provides the CPU conditional instructions to the coprocessor. The condition code signal group transfers the result of condition code evaluation from the coprocessor to the CPU upon evaluation of the CPU conditional instructions by the coprocessor indicating to the CPU whether or not it should execute the CPU conditional instructions.

In yet another aspect, the present invention provides a method for transferring instructions, and data associated with the instructions, from a central processing unit (CPU) to a coprocessor, where the data associated with the instructions is transferred from the coprocessor to the CPU in variable time slots after transfer of their associated instructions, and out-of-order with respect to their associated instructions. The method includes: transferring the instructions to the coprocessor; tracking the number of outstanding instructions that require data for execution; and providing, along with each data transfer, a relative order indication, to associate each data transfer with one of the number of outstanding instructions that require data for execution; wherein the coprocessor utilizes the relative order indication to place each data transfer with its associated instruction.

Other features and advantages of the present invention will become apparent upon study of the remaining portions of the specification and drawings.

DETAILED DESCRIPTION

Figure 1:
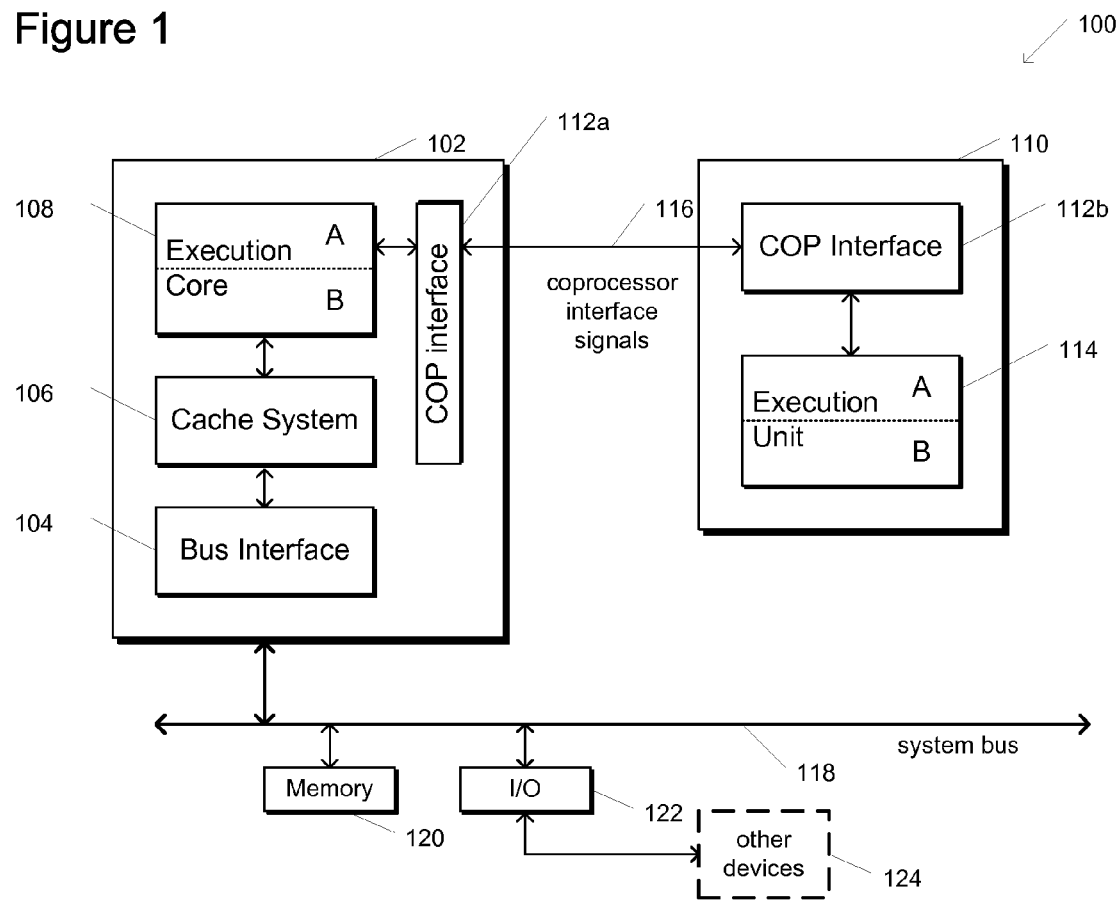
FIG. 1 is a block diagram of a central processing unit (CPU) coupled to a coprocessor utilizing the coprocessor interface of the present invention.

Referring to FIG. 1, a portion of a computing system 100 is shown. The computing system 100 provides a central processing unit (CPU) 102 coupled to memory 120 via a system bus 118. In general, the CPU 102 executes instructions retrieved from the memory 120, and interfaces with other devices 124 that are external to it via an I/O interface 122 attached to the system bus 118.

The CPU 102 is also coupled to a coprocessor 110 utilizing a coprocessor interface according to the present invention. The coprocessor 110 may be any type of coprocessor, but most commonly is a floating-point coprocessor, or a graphics (3-D) coprocessor. As will be more fully described below, with reference to FIG. 2, the CPU 102 retrieves instructions from the memory 120, and determines whether the instructions are directed to it, or to the coprocessor 110. If the instructions are to be directed to the coprocessor 110, they are provided using the coprocessor interface of the present invention.

Within the CPU 102 are a bus interface 104, a cache system 106, an execution core 108, and a coprocessor interface 112*a*. The bus interface 104 is coupled to the system bus 118 for retrieving and storing instructions and data, from and to the memory 120, and for communicating with the other devices 124. Data and instructions retrieved by the bus interface are provided to the cache system so that they may be immediately accessible to the execution core 108. The execution core 108 executes instructions provided to it by the cache system 106, operating on data that is either resident within the cache system 106, or retrieved by the bus interface 104.

In one embodiment, the execution core 108 is split into two (or more) execution units (designated A & B), each capable of executing instructions directed to the CPU 102. That is, two (or more) instructions may be provided to the execution units A & B, within the execution core 108, for simultaneous execution.

The execution core 108 is coupled to a coprocessor interface (COP interface) 112*a*. The COP interface 112*a* enables coprocessors such as floating point units (FPU's) and Graphics Engines to be tightly coupled to an integer processor core such as the execution core 108. In one embodiment, the COP interface 112*a* is designed to allow coprocessors to interface with various processor cores designed by MIPS Technologies, of Mountain View, Calif.

The COP interface 112*a* includes many features, each of which will be further described below, with reference to FIGS. 3–14. More specifically, the COP interface 112*a* allows 32-bit or 64-bit data transfer between an integer core and a coprocessor. In addition, the COP interface 112*a* supports one or more coprocessors, each of which may have one or more execution units. The COP interface 112*a* allows between 0 and 8 out-of-order data transfers. And, the COP interface 112 allows either single-issue of instructions, or multiple instruction issue, to one or more coprocessors, where each issue supports arithmetic and/or data transfers. Furthermore, as will be more particularly described with reference to FIGS. 10, 11, and 13, the COP interface 112 allows for user defined exceptions, and coprocessor defined condition code interpretation. Finally, the COP interface 112*a* is designed to support coprocessor instructions defined in the MIPS32, MIPS64, MDMX and MIPS-3D architecture specifications available from MIPS Technologies, Inc. Of course, one skilled in the art will appreciate that the novel features of the COP interface 112*a* are not restricted to data size, instruction set architecture, etc. Rather, the COP interface 112*a* is applicable to any interface between a CPU and a coprocessor where the design considerations include scalability, compatibility (both forward and backward), and/or configurability.

As shown in FIG. 1, the COP interface 112*a* within the CPU 102 is coupled to a coprocessor 110 via coprocessor interface signal lines 116. Within the coprocessor 110 are a COP interface 112*b* and an execution unit 114. The COP interface 112*b* is similar to the COP interface 112*a*, but is designed to communicate from the coprocessor 110 to the CPU 102. The execution unit 114 may either be a single-issue execution unit, or may be split into two (or more) execution units A and B for simultaneous execution of multiple coprocessor instructions.

Operation of the computing system 100 will now be described with respect to the flow of instruction execution by reference to the flow chart 200 of FIG. 2, to which attention is now directed.

Instruction flow begins when instructions are fetched 202 by the execution core 108. That is, a program counter (not shown) contains an address related to the next instruction to be executed. This address is provided to the cache system 106 for determination of whether the instruction is resident within the cache system 106. If it is not, the instruction is first fetched from the memory 120, by the bus interface 104 and is provided to the execution core 108. Once the instruction is provided to the execution core 108, the instruction flow proceeds to the decode block 204.

At decode block 204, the execution core decodes the instruction to be executed. That is, the decode block performs a variety of decoding functions, including determining whether the instruction is a branch instruction, and if so, predicting whether the branch will be taken, determining what operands are necessary for execution of the instruction, etc. Instruction flow then proceeds to decision block 206.

At decision block 206, the execution core 108 determines whether the instruction to be executed is an integer instruction to be executed by the execution core 108, or whether the instruction is a coprocessor instruction to be executed by the execution unit 114. If the instruction is an integer instruction, instruction flow proceeds to block 208. Otherwise, the execution core 108 provides the coprocessor instruction to the COP interface 112a. The COP interface 112a then presents the coprocessor instruction, and any associated data for the instruction, to the coprocessor 110 for execution. Instruction flow then proceeds to block 212.

At block 208, the execution core 108 executes the integer instruction. Instruction flow then proceeds to block 210 where the result of the execution, if any, is written back into a register (or memory location) within the CPU 102.

At block 212, the COP interface 112b receives the coprocessor instruction from the CPU 102 for execution. The coprocessor instruction, and its associated data, are provided to the execution unit 114 for execution. The result of the execution remains in the coprocessor 110 until future instructions request that the result be transferred to the CPU 110.

Figure 2:
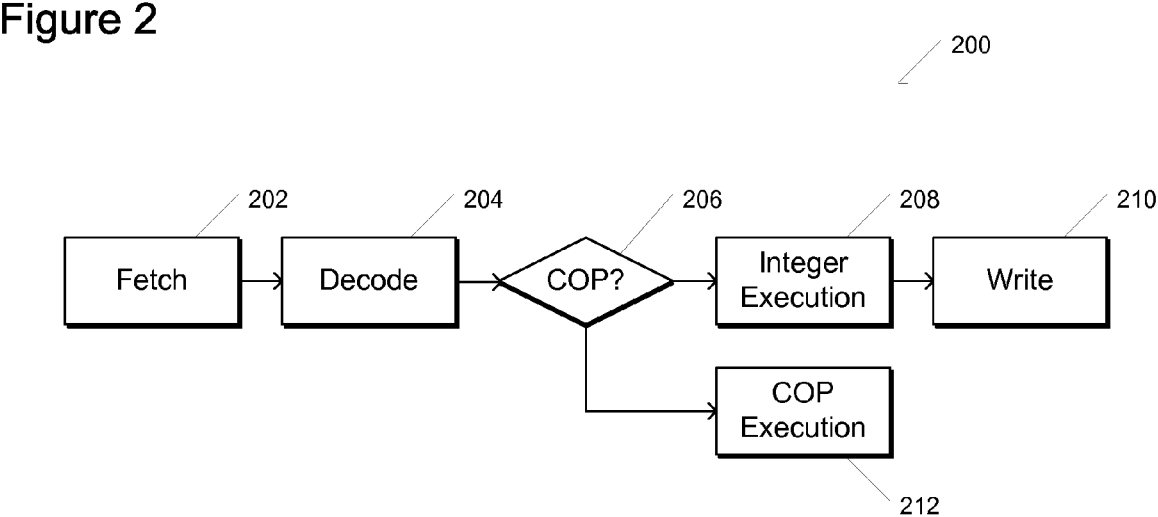
FIG. 2 is a flow chart illustrating instruction flow through the CPU and coprocessor of FIG. 1.

The above discussion, with reference to FIGS. 1 and 2 provides a general understanding of an interface between a CPU 102 and a coprocessor 110, utilizing the coprocessor interface 112 of the present invention. With the above in mind, particular operational specifics of the COP interface 112 of FIG. 1 will now be described with reference to FIGS. 3–14 by description of specific interface signals within the COP interface 112, and their operation with respect to such functions as instruction transfers, data TO transfers, data FROM transfers, etc.

Instruction Transfer

Instruction transfer refers to how coprocessor instructions are provided from a CPU to a coprocessor. Table 1 below provides a brief summary of some of the instruction transfer signals that are provided within the COP interface of the present invention. Illustration of how these signals operate will be further described below with reference to FIGS. 3–6.

TABLE 1

| Signal Name | Dir | Issue Group | Description |
| --- | --- | --- | --- |
| CP_ir_m[31:0] | Out | Comb, Arith, TF | Coprocessor Instruction Word. Valid in the cycle before CPx_as_m, CPx_ts_m, CPx_fs_m is asserted. |
| CPx_as_m | Out | Comb, Arith | CoprocessorX Arithmetic Instruction Strobe. Asserted in the cycle after an arithmetic coprocessorX instruction is available on CP_ir_m. If CPx_abusy_m was asserted in the previous cycle, this signal will not be asserted. In any cycle, at most 1 of the following signals can be asserted at a time in a particular issue group. CPx_as_m, CPx_ts_m, CPx_fs_m. |
| CPx_abusy_m | In | Comb, Arith | CoprocessorX Arithmetic Busy. When asserted, a coprocessorX arithmetic instruction will not be dispatched. CPx_as_m will not be asserted in a cycle after the signal is asserted. |
| CPx_ts_m | Out | Comb, TF | CoprocessorX to Strobe. Asserted in the cycle after a To COPx Op instruction is available on CP_ir_m. If CPx_tbusy_m was asserted in the previous cycle, this signal will not be asserted. In any cycle, at most 1 of the following signals can be asserted at a time in a particular issue group: CPx_as_m, CPx_ts_m, CPx_fs_m. |
| CPx_tbusy_m | In | Comb, Arith | To CoprocessorX Busy. When asserted, a To COPx Op instruction will not be dispatched. CPx_ts_m will not be asserted in a cycle after the signal is asserted. |
| CPx_fs_m | Out | Comb, TF | CoprocessorX From Strobe. Asserted in the cycle after a From COPx Op instruction is available on CP_ir_m. If CPx_fbusy_m was asserted in the previous cycle, this signal will not be asserted. In any cycle, at most 1 of the following signals can be asserted at a time in a particular issue group: CPx_as_m, CPx_ts_m, CPx_fs_m. |
| CPx_fbusy_m | In | Comb, Arith | From CoprocessorX Busy. When asserted, a From COPx Op instruction will not be dispatched. CPx_fs_m will not be asserted in a cycle after the signal is asserted. |
| CP_order_m[2:0] | Out | Comb, Arith, TF | Coprocessor Dispatch Order. Signifies the program order of instructions when more than one instruction is issued in a single cycle. Each instruction dispatched has an order value associated with it. There must always be one instruction whose order value is 0. Order values must increment by 1 when more than one instruction is issued in a cycle. Valid when CPx_as_m, CPx_ts_m, or CPx_fs_m is asserted. |
| CP_VNs_m | Out | Comb, Arith, TF | Coprocessor Valid or Null Strobe. Asserted when a valid or null signal is available on CP_VN_m. |
| CP_VN_m | Out | Comb, Arith, TF | Valid or Nullify Coprocessor Instruction. When deasserted, the integer processor core is signaling that the instruction is valid, i.e., not nullified. When asserted, the integer processor core is signaling that the instruction is nullified. Valid when CP_VNs_m is asserted. |

Signal names in Table 1, and in the other tables that follow should be interpreted as follows:

Signal names beginning in CP_ relate to signals from a CPU to any/all coprocessors coupled to the CPU. Signal names beginning in "CPx"_ are specific to particular coprocessors attached to the CPU. That is, if two coprocessors are attached to a CPU, two sets of signal lines will be provided by the coprocessor interface within the CPU. The first set of signal lines will begin "CP1_", the second set of signal lines will begin "CP2_", etc. Rather than illustrate separate signals for CP1 and CP2, they have been combined in the present discussion as "CPx" for purposes of clarity. Note: in one embodiment, within the context of the MIPS architecture, the only valid coprocessors are CP1 and CP2.

In addition, instruction types have been designated as arithmetic (a), data TO coprocessor (t), or data FROM coprocessor (f). So, arithmetic signal names include the letter "a", TO signal names include the letter "t", and FROM signal names include the letter "f". By distinguishing between arithmetic, data to, and data from instructions, the coprocessor interface of the present invention allows coprocessors to disable certain types of instructions, within particular issue groups.

The ending designation "_m" designates a particular issue group. The coprocessor interface of the present invention is extensible to support both single-issue and multi-issue cores and coprocessors. That is, a single issue CPU can support one or more multi-issue coprocessors. Alternatively, a multi-issue CPU can utilize single or multi-issue coprocessors. Multi-issue support is achieved by duplicating certain signals of the coprocessor interface. Thus, if support of single-issue is desired, only one set of signals is necessary, with the signal names ending in _m represented by "_0". If multi-issue support is desired, then two sets of signals are necessary, with signal names ending in m represented by "_0" for the first set, and "_1" for the second set, etc.

In one embodiment, all transfers between a CPU and a coprocessor are synchronously strobed. That is, a transfer, whether instruction or data, is only valid for one cycle (when a strobe signal is asserted). In addition, there is no handshake confirmation of transfer, nor is there flow control relating to the transfer. Furthermore, except for data transfers, out-of-order transfers are not allowed. That is, all transfers of a given type, within the same issue group (to be further described below), must be in instruction dispatch-order. However, ordering of different types of transfers for the same instruction is not restricted.

Figure 3:
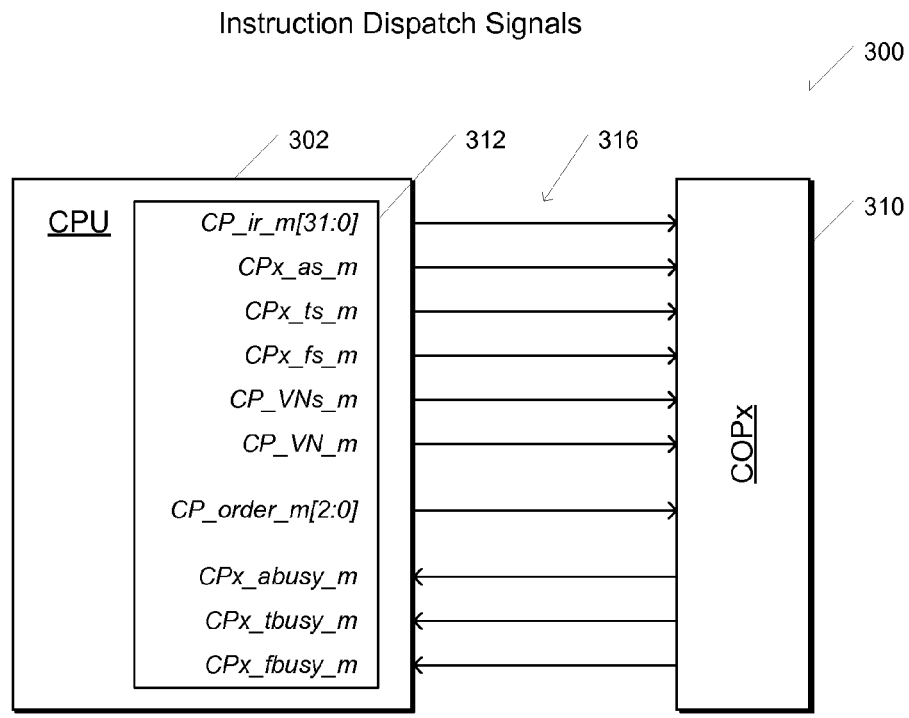
FIG. 3 is a block diagram illustrating instruction dispatch signals between a CPU and a coprocessor utilizing the coprocessor interface of the present invention.

Referring now to FIG. 3, a block diagram 300 is shown illustrating particular instruction dispatch signals 316 between a CPU 302 and a coprocessor 310 that were summarized above in Table 1. Each of the CPU 302 and the coprocessor 310 contains a COP interface 312 according to the present invention to allow instruction dispatch as follows.

Figure 4:
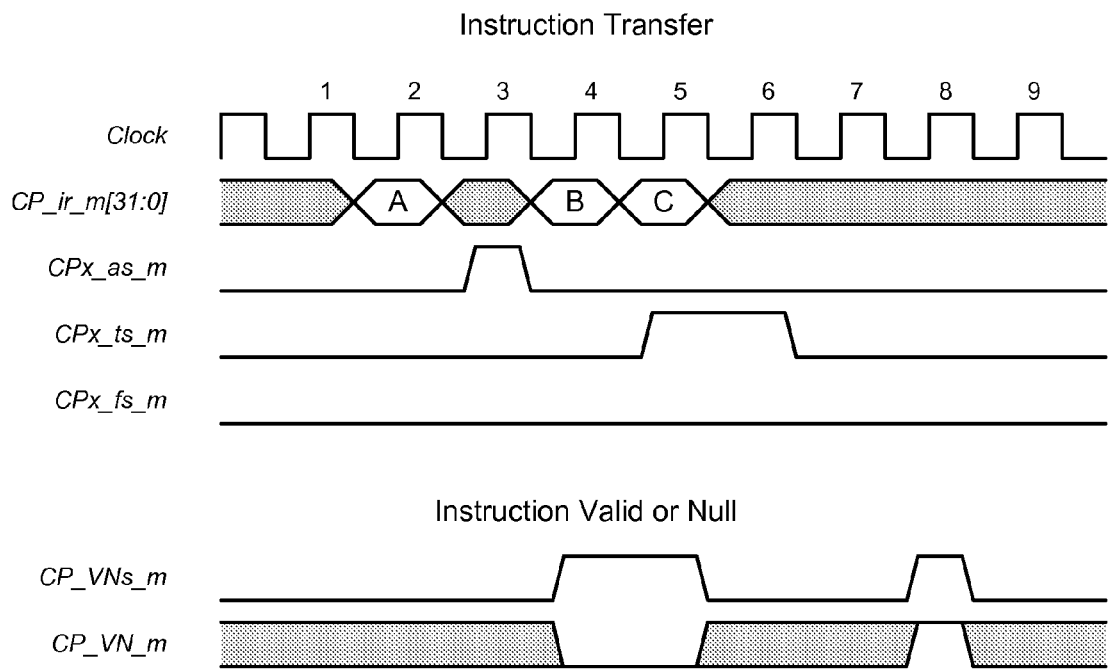
FIG. 4 is a timing diagram illustrating how instructions are dispatched on the coprocessor interface of the present invention.

FIG. 4 provides a timing diagram 400 illustrating a simple case of instruction transfer. That is, three coprocessor instructions A, B & C will be transferred by the CPU 302 to the coprocessor 310. All of the signals shown in FIG. 4 are synchronous with respect to a common clock signal generated by the CPU 302. In one embodiment, the clock signal is the core frequency signal of the CPU 302.

At clock cycle 2, a coprocesor instruction A has been placed by the coprocessor interface 312 within the CPU 302 on CP_ir_m[31:0]. This instruction is an arithmetic instruction, such as an ADD, MULTIPLY, DIVIDE, but may be another type of instruction defined within the arithmetic group. In addition, this instruction is in the issue group designated by "_m". At the beginning of clock cycle 2, it is said that instruction A has been dispatched by the coprocessor interface 312.

After an instruction is dispatched, additional information about that instruction must be transferred between the CPU 302 and the coprocessor 310. Such information includes the type of instruction (a, t, or f), an indication of which coprocessor the instruction is destined for (CP1, CP2, etc.), and the issue group to which the instruction belongs (0, 1, 2 . . . ).

At clock cycle 3, the coprocessor interface 312 asserts the instruction dispatch strobe signal CPx_as_m to indicate to the coprocessor 310 that the instruction dispatched during the previous cycle should be used by the coprocessor as an active instruction, and that it was an arithmetic instruction. It is possible that the instruction dispatch strobe signal may be asserted in the same cycle as the instruction dispatch.

Each such transfer can occur as early as one cycle after instruction dispatch, with no maximum limit on how late the transfer can occur. That is, only the dispatch portion of the coprocessor interfaces have flow control. In addition, the coprocessor interface 312 is designed to operate with coprocessors of any pipeline structure and latency. If the CPU 302 requires a specific transfer by a certain cycle, the CPU 302 must stall until the transfer has completed. In addition, all transfers are strobed. That is, independent of strobing, data is transferred in the cycle that the strobe signal is asserted. If the strobe signal is asserted for 2 cycles, then two transfers occur.

At clock cycle 4, an instruction B is dispatched on signal lines CP_ir_m.

At clock cycle 5, an instruction C is dispatched on signal lines CP_ir_m. In addition, the coprocessor interface 312 asserts a CPx_ts_m signal to the coprocessor 310 to indicate that the instruction dispatched on the previous cycle (instruction B) should be used as a TO coprocessor data instruction.

At clock cycle 6, the coprocessor interface 312 asserts a CPx_ts_m signal to the coprocessor 310 to indicate that the instruction dispatched in the previous cycle (instruction C) should be used as a TO coprocessor data instruction.

At this point, three instructions have been transferred by the coprocessor interface 312 to the coprocessor 310: an arithmetic instruction A, and two TO coprocessor data instructions B and C. One skilled in the art should appreciate, however, that the instructions could have been dispatched to different coprocessors, if available, by utilizing separate strobe lines designated by "CP1_ts_m" and "CP2_ts_m", for example.

Instruction Valid or Nullify

All instructions that are dispatched must be indicated as valid or nullified by the execution core after dispatch to the coprocessor 310. The valid or nullify transfer signals within the coprocessor interface 312 must occur so that the coprocessor 310 knows when it can begin operation of subsequent operations that depend on the result of the current instruction. Validity or Nullification must be performed in an early stage of the coprocessor 310's pipeline to insure that subsequent instructions can begin with correct operands.

Referring to FIG. 4, on clock cycle 4, the coprocessor interface 312 asserts strobe signal CP_VNs_m. This assertion corresponds to a validity/nullification transfer for instruction A. Also during clock cycle 4, the coprocessor interface 312 deasserts signal CP_VN_m to indicate that instruction A is valid and should not be nulled.

On clock cycle 5, the coprocessor interface 312 continues to assert strobe signal CP_VNs_m, and continues to deassert signal CP_VN_m to indicate that instruction B is valid.

On clock cycle 8, the coprocessor interface 112 asserts strobe signal CP_VNs_m corresponding to a validity or nullification transfer for instruction C. Also during clock cycle 8, the coprocessor interface 312 asserts signal CP_VN_m to indicate to the coprocessor that instruction C should be nulled.

Thus, instruction validity or nullification continues for all instructions transferred between the CPU 302 and the coprocessor 310. There is no tag or other identification relating a validity or nullification signal on CP_VN_m with an instruction. Rather, since the instructions are in-order, the coprocessor interfaces within both the CPU 302 and the coprocessor 310 keep track of each transferred instruction, and do not allow an instruction to use operands generated by previous instructions until those previous instructions have received a CP_VN_m signal. In addition, if an instruction is nullified, no remaining transfers for that instruction will occur. If a transfer related to a nullified instruction occurs during the cycle of nullification, the transfer will be ignored.

Instruction Ordering—Multiple Issue Groups

Figure 5:
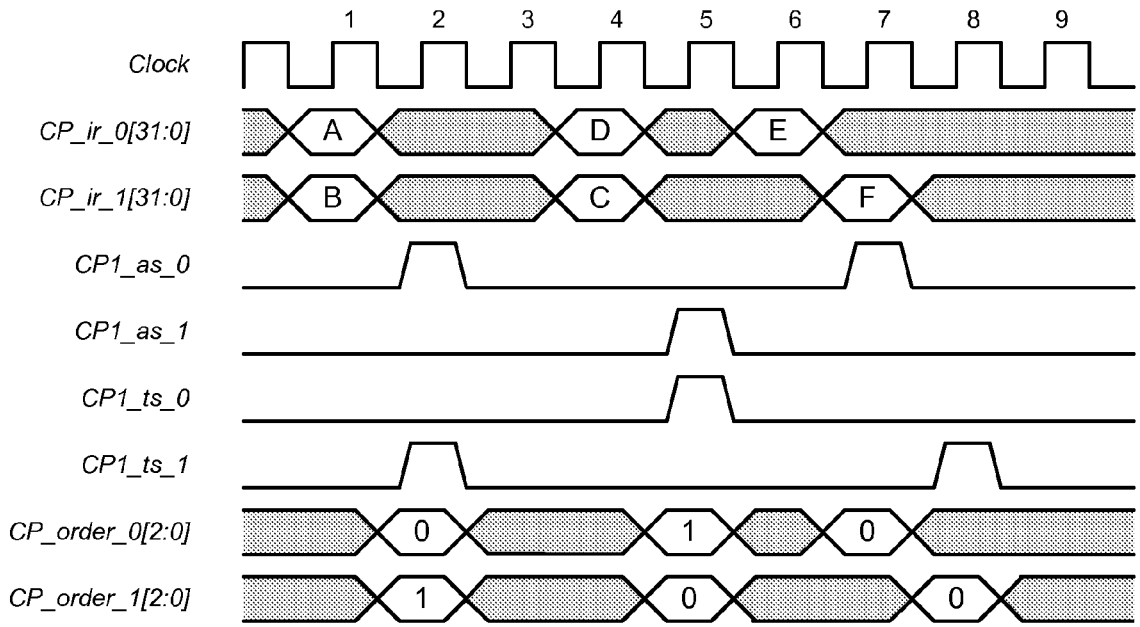
FIG. 5 is a timing diagram illustrating how multiple instructions are dispatched to multiple issue groups via the coprocessor interface of the present invention.

Referring now to FIG. 5, a timing diagram 500 is provided to particularly illustrate how instructions are transferred to multiple issue groups. In this timing diagram, it is presumed that the CPU 302 is a dual issue integer processor. The coprocessor 310 is also a dual issue coprocessor. The two issue pipes within the coprocessor 310 are designated as *_0 and *_1, respectively. And, the coprocessor interfaces 312 of both the CPU 302 and the coprocessor 310 include interface signals corresponding to each of the two issue groups.

In clock cycle 1, two instructions A and B are dispatched by the coprocessor interface 312 within the CPU 302. Instruction A appears on signal lines CP_ir_0 corresponding to the first issue group (or pipe within coprocessor 310). Instruction B appears on signal lines CP_ir_1 corresponding to the second issue group (or pipe within coprocessor 310).

During clock cycle 2, the coprocessor interface 312 within the CPU 302 asserts strobe line CP1_as_0 to designate instruction A as an arithmetic instruction, to indicate to the coprocessor 310 that it is the target coprocessor for the instruction (i.e., CP1), to indicate that the pipe for which instruction A is intended is the "0" pipe, and to complete the transfer of instruction A to the coprocessor. Additionally, the coprocessor interface 312 within the CPU 302 asserts strobe line CP1_ts_1 to designate instruction B as a TO coprocessor data transfer instruction, to indicate to the coprocessor 310 that it is the target coprocessor for the instruction (i.e., CP1), to indicate that the pipe for which instruction B is intended is the "1" pipe, and to complete the transfer of instruction B to the coprocessor. While not shown, it should be appreciated that instruction validity or nullification also occurs during later clock cycles, similar to that illustrated in FIG. 4.

Also during clock cycle 2, instruction order signals are presented by the coprocessor interface 312 to the coprocessor 310 to indicate the programming order of instructions A and B. That is, even though instructions A and B are presented in parallel to the two instruction pipes "0" and "1" within the coprocessor 310, an indication must be presented to the coprocessor 310 to indicate their original order with respect to the program. Such order indication is necessary to insure that the coprocessor 310 resolves any dependencies between the instructions correctly.

Thus, each issue group carries an order signal to indicate the order of the instruction in that issue group with respect to the others. Two signal groups are provided between the CPU 302 and the coprocessor 310, corresponding to the two execution pipes within the coprocessor 310. The first signal group is CP_order_0, corresponding to the "0" pipe. The second signal group is CP_order_1, corresponding to the "1" pipe. Thus, during clock cycle 2, at the time instructions A and B are transferred by the strobe signals, the relative order of instructions A and B are designated by the two signal groups. More specifically, signal group CP_order_0 indicates to the "0" pipe in the coprocessor 310, that the instruction transferred to it, i.e., instruction A, is the first instruction, having a relative order of "0". And, signal group CP_order_1 indicates to the "1" pipe in the coprocessor 310 that the instruction transferred to it, i.e., instruction B, is the second instruction, having a relative order of "1".

During clock cycle 4, two more instructions, C and D are dispatched by the coprocessor interface 312 within the CPU 302 to the coprocessor 310. Instruction C is dispatched on signal group CP_ir_1 indicating that it is intended for the "1" pipe of coprocessor 310, and instruction D is dispatched on signal group CP_ir_0 indicating that it is intended for the "0" pipe of coprocessor 310. Note, if more than two coprocessors are coupled to the coprocessor interface 312 of the CPU 302, then the transfer of the dispatched instructions is designated by the strobe signals associated with each of the coprocessors (e.g., CP1 vs. CP2).

During clock cycle 5, transfer of instruction C to pipe "1" of the coprocessor 310 is completed by assertion of strobe line CP1_as_1. Assertion of this strobe line indicates that instruction C is an arithmetic instruction, and that it is directed to coprocessor CP1, in its "1" pipe. Also, transfer of instruction D to pipe "0" of the coprocessor 310 is completed by assertion of strobe line CP1_ts_0. Assertion of this strobe line indicates that instruction D is a TO coprocessor data transfer instruction, and that it is directed to coprocessor CP1, in its "0" pipe.

Also during clock cycle 5, the relative order of instructions C and D are provided to the coprocessor 310 via signal groups CP_order_0, and CP_order_1. Signal group CP_order_1 designates that instruction C is the first instruction, by providing a relative order quantity of "0" to the coprocessor 310. Signal group CP_order_0 designates that instruction D is the second instruction, by providing a relative order quantity of "1" to the coprocessor 310.

During clock cycle 6, instruction E is dispatched by the coprocessor interface 312 to the coprocessor 310.

During clock cycle 7, instruction E transfer is completed by assertion of strobe line CP1_as_0. This strobe line indicates that instruction E is designated for coprocessor CP1, that the instruction is an arithmetic instruction, and that it should be executed by the "0" pipe. Since instruction E was the only instruction dispatched during clock cycle 6, its relative dispatch order is provided by signal group CP_order_0 as "0".

Also during clock cycle 7, instruction F is dispatched by the coprocessor interface 312 to the "1" pipe of the coprocessor 310.

During clock cycle 8, instruction F transfer is completed by assertion of strobe line CP1_ts_1. This strobe line indicates that instruction F is designated for coprocessor CP1, that the instruction is a TO coprocessor data transfer instruction, and that it should be executed by the "1" pipe. Since instruction F was the only instruction dispatched during clock cycle 7, its relative dispatch order is provided by signal group CP_order_1 as "0".

Although not particularly illustrated, one skilled in the art should appreciate that by providing a 3-bit signal group for each available issue group, up to 8 instructions may be dispatched at the same time, while still tracking their relative order for instruction execution.

Instruction Transfer—Coprocessor Busy

Figure 6:
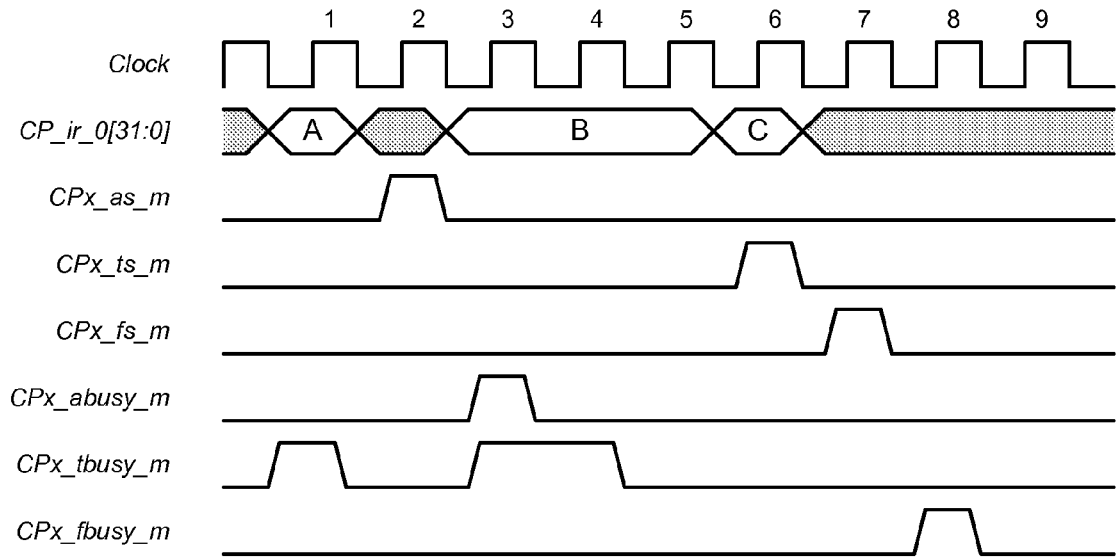
FIG. 6 is a timing diagram illustrating how the coprocessor delays instruction dispatch from the CPU utilizing busy signals on the coprocessor interface of the present invention.

Referring now to FIG. 6, a timing diagram 600 is shown which particularly illustrates the operation of various busy signals available on the coprocessor interface of the present invention. More specifically, each coprocessor that is coupled to a CPU may reach a point during execution of instructions such that it can't receive further instructions. Within the coprocessor interface of the present invention, busy signals are provided from the coprocessor to the CPU for each of the instruction types (a, t and f), for each available issue group.

During clock cycle 1, an instruction A is dispatched on signal group CP_ir_0. Also during cycle 1, a busy signal is asserted by coprocessor CPx on signal line CPx_tbusy_m. Assertion of this signal line indicates to the coprocessor interface 312 within the CPU 302 that coprocessor CPx cannot receive a TO coprocessor data instruction.

During clock cycle 2, instruction A transfer is completed by assertion of strobe line CPx_as_m. That is, although the coprocessor 310 asserted a busy signal, the busy portion of the coprocessor was related to TO coprocessor data instructions, not to arithmetic instructions. So, instruction A dispatch is attempted and transferred.

During clock cycle 3 instruction B is dispatched by the coprocessor interface 312. However, busy signals are being asserted by both the arithmetic and TO coprocessor data transfer portions of the coprocessor 310. So, the coprocessor interface 312 within the CPU 302 continues to attempt dispatch of instruction B until the busy signal corresponding to its instruction type is deasserted.

Also, during clock cycle 3, the arithmetic busy signal is deasserted. Since instruction B continues to be dispatched by the coprocessor interface 312, it appears that instruction B is not an arithmetic instruction.

During clock cycle 4, the TO coprocessor data transfer busy signal is deasserted. Since instruction B continues for 1 more clock cycle, it appears that instruction B is a TO coprocessor data transfer instruction.

During clock cycle 5, instruction B is dispatched.

During clock cycle 6, instruction B transfer is completed by assertion of strobe CPx_ts_m. Also during clock cycle 6, instruction C is dispatched by the coprocessor interface 312 within the CPU 302.

During clock cycle 7, instruction C transfer is completed by assertion of strobe signal CPx_fs_m, indicating that instruction C is a FROM coprocessor data transfer instruction.

During clock cycle 8, a busy signal is asserted on signal line CPx_fbusy_m to indicate that during cycle 8, the coprocessor 310 cannot receive another FROM data transfer instruction.

What should be appreciated from the above is that at any time during execution of instructions by a coprocessor, should that coprocessor's resources become consumed, within a particular group (a, t, or f), the coprocessor can prevent further instructions from being transferred that are specific to the particular group, without affecting transfer of instructions to other groups.

To/From Coprocessor Data Transfer

To/From data transfer refers to how data, corresponding to previously transferred instructions is provided from a CPU to a coprocessor, and vice versa. Table 2 below provides a brief summary of some of the data transfer signals that are provided within the COP interface of the present invention. Illustration of how these signals operate will be further described below with reference to FIGS. 7–9.

TABLE 2

| Signal Name | Dir | Issue Group | Description |
|---|---|---|---|
| To Coprocessor Data (For all To COP Ops) | | | |
| CP_tds_m | Out | Comb, TF | Coprocessor To Data Strobe. Asserted when To COP Op data is available on CP_tdata_m. |
| CP_torder_m[2:0] | Out | Comb, TF | Coprocessor To Order. Specifies which outstanding To COP Op the data is for. Valid only when CP_tds_m is asserted.<br>CP_torder_m  Order<br>3'b000  Oldest outstanding to COP Op data transfer<br>3'b001  2$^{nd}$ oldest To COP OP data transfer<br>3'b010  3$^{rd}$ oldest To COP OP data transfer<br>3'b011  4$^{th}$ oldest To COP OP data transfer<br>3'b100  5$^{th}$ oldest To COP OP data transfer<br>3'b101  6$^{th}$ oldest To COP OP data transfer<br>3'b110  7$^{th}$ oldest To COP OP data transfer<br>3'b111  8$^{th}$ oldest To COP OP data transfer |
| CP_tdata_m[63:0] | Out | Comb, TF | To Coprocessor Data. Data to be transferred to the coprocessor. For single word transfers, data is valid on CP_tdata_m[31:0]. Valid when CP_tds_m is asserted. Note: In 32 bit data transfer size configuration, this bus is reduced to CP_tdata_m[31:0]. |
| CP_tordlim_m[2:0] | Sin | Comb, TF | To Coprocessor Data Out-of-Order Limit. This signal forces the integer processor core to limit how much it can reorder To COP data. The value on this signal corresponds to the maximum allowed value to be used on CP_torder_m[2:0]. |

TABLE 2-continued

| Signal Name | Dir | Issue Group | Description |
|---|---|---|---|
| | | From Coprocessor Data (For all From COP Ops) | |
| CP_fds_m | In | Comb, TF | Coprocessor From Data Strobe. Asserted when From COP Op data is available on CP_fdata_m. |
| CP_forder_m[2:0] | In | Comb, TF | Coprocessor From Order. Specifies which outstanding From COP Op the data is for. Valid only when CP_fds_m is asserted. |

| CP_forder_m | Order |
|---|---|
| 3'b000 | Oldest outstanding From COP Op data transfer |
| 3'b001 | $2^{nd}$ oldest From COP OP data transfer |
| 3'b010 | $3^{rd}$ oldest From COP OP data transfer |
| 3'b011 | $4^{th}$ oldest From COP OP data transfer |
| 3'b100 | $5^{th}$ oldest From COP OP data transfer |
| 3'b101 | $6^{th}$ oldest From COP OP data transfer |
| 3'b110 | $7^{th}$ oldest From COP OP data transfer |
| 3'b111 | $8^{th}$ oldest From COP OP data transfer |

| Signal Name | Dir | Issue Group | Description |
|---|---|---|---|
| CP_fdata_m[63:0] | In | Comb, TF | From Coprocessor Data. Data to be transferred from coprocessor. For single-word transfers, data must be duplicated on both CP_fdata_m[63:32] and CP_fdata_m[31:0]. Valid when CP_fds_m is asserted. Note: In 32 bit data transfer size configuration, this bus is reduced to CP_fdata_m[31:0]. |
| CP_fordlim_m[2:0] | Sout | Comb, TF | From Coprocessor Data Out-of-Order Limit. This signal forces the coprocessor to limit how much it can reorder From COP Data. The value on this signal corresponds to the maximum allowed value to be used on CP_forder_m[2:0] |

Figure 7:
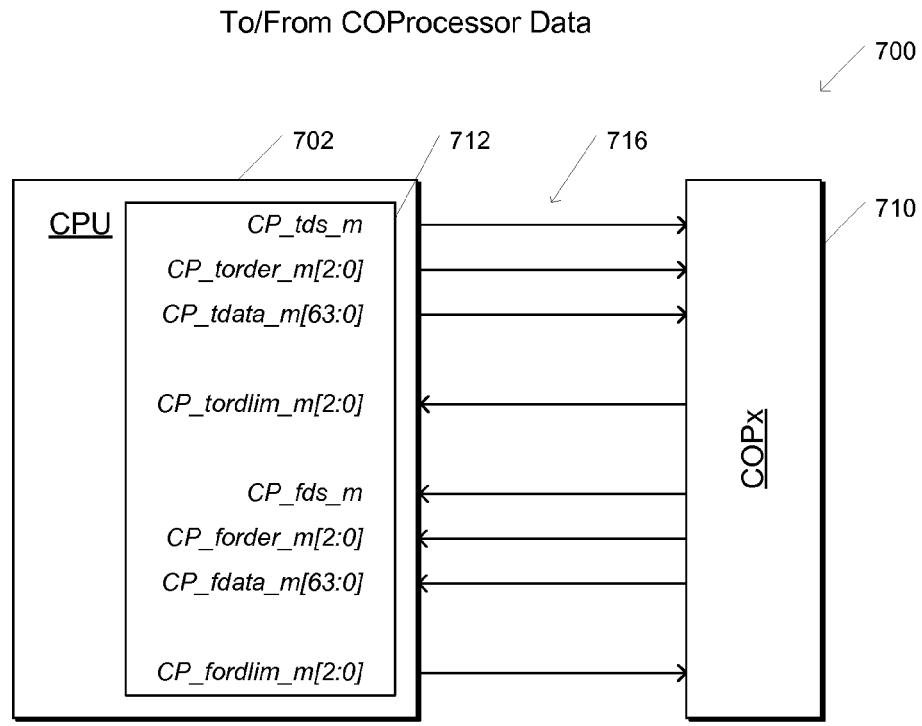
FIG. 7 is a block diagram illustrating coprocessor to/from data transfer instruction signals between a CPU and a coprocessor utilizing the coprocessor interface of the present invention.

Referring now to FIG. 7, a block diagram 700 is shown illustrating particular data transfer signals 716 between a CPU 702 and a coprocessor 710 that were summarized above in Table 2. Each of the CPU 702 and the coprocessor 710 contain a COP interface 712 according to the present invention to allow data transfer as follows.

The coprocessor interface 712 within the CPU 702 transfers data to the coprocessor 710 after a TO coprocessor data transfer instruction has been dispatched. Only TO coprocessor data transfer instructions utilize this transfer. The coprocessor 710 must have a buffer available for this data after the To coprocessor data transfer instruction has been dispatched. If no buffers are available, the coprocessor 710 must prevent instruction dispatch by asserting CPx_tbusy_m.

The coprocessor interface 712 allows out-of-order data transfers. That is, data can be sent by the CPU 702 to the coprocessor 710 in a different order from the order in which instructions were dispatched. When data is sent to the coprocessor 710, the CP_torder_m[2:0] signal group is also sent. This signal group tells the coprocessor 710 if the data word is for the oldest outstanding To coprocessor data transfer instruction, or the $2^{nd}$ oldest, or the $3^{rd}$ oldest, and so on. The coprocessor interface 712 allows up to 7 transfers to be outstanding while returning data for the next transfer. The coprocessor 710 can limit the extent of this reordering to match what its hardware supports, by using the CP_tordlim_m[2:0] signal group.

To Coprocessor Data Transfer

Figure 8:
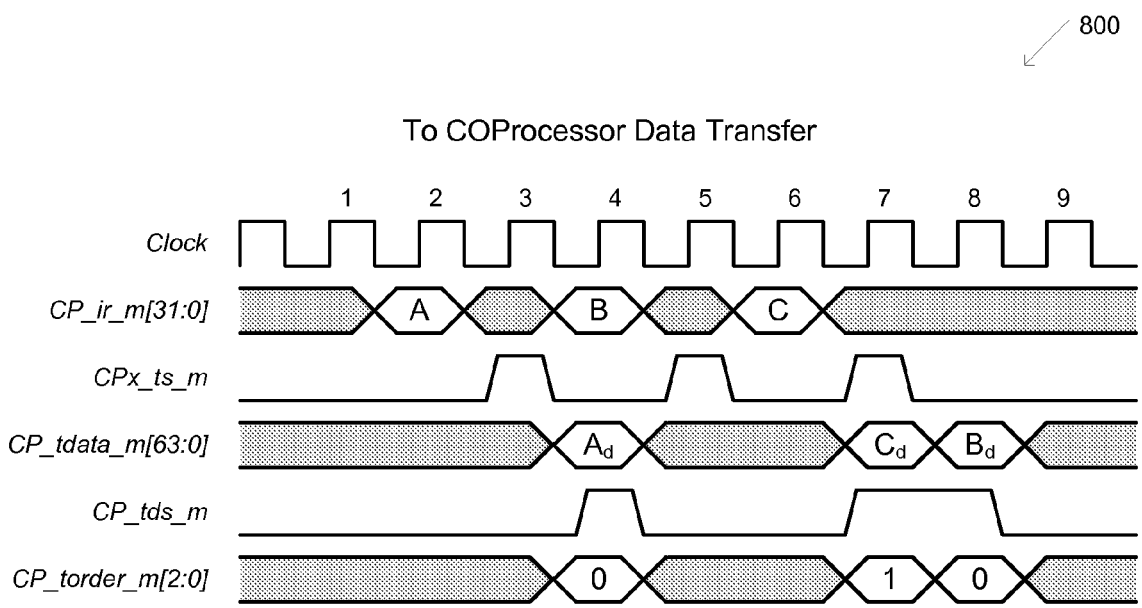
FIG. 8 is a timing diagram illustrating how data is transferred from a CPU to a coprocessor utilizing the coprocessor interface of the present invention.

Referring to FIG. 8, a timing diagram is shown illustrating data transferred from the CPU 702 to the coprocessor 710 via the coprocessor interface 712 of the present invention.

During clock cycles 2, 4, and 6, To coprocessor data transfer instructions A, B, and C are dispatched by the coprocessor interface 712. These instruction transfers are completed with the assertion of the strobe signal CPx_ts_m in the following respective clock cycles.

During clock cycle 4, data corresponding to instruction A is presented on the signal group CP_tdata_m[63:0]. In the same clock cycle the data transfer is completed by assertion of strobe signal CP_tds_m. In addition, the relative order of the data being transmitted on the signal group CP_tdata_m is provided by the signal group CP_torder_m[2:0]. In this instance, since there are no outstanding To coprocessor data transfer instructions, the relative order of the data is "0".

During clock cycle 7, data corresponding to outstanding To coprocessor data transfer instruction C is presented on signal group CP_tdata_m[63:0]. In addition, the data transfer is completed by assertion of strobe signal CP_tds_m. At this point, the data presented during clock cycle 7 is out-of-order with respect to its corresponding instruction C. That is, the data corresponding to instruction B has not yet been presented. This fact is communicated by the CPU 702 via signal group CP_torder_m when it presents a value of "1" on its signal lines. When the coprocessor interface 712 within the coprocessor 710 sees the "1" value on this signal group, it understands that the data being received is to be associated with the $2^{nd}$ oldest outstanding data transfer instruction, which in this case is instruction C.

During clock cycle 8, data associated with instruction B is presented on signal group CP_tdata_m. In addition, the data transfer is completed by assertion of strobe signal CP_tds_m. Finally, the relative order of the data being presented is provided via signal group CP_torder_m. In this instance, since the data associated with instruction A has already been provided, the data associated with instruction B is the oldest outstanding data. The coprocessor interface 712 within the CPU 702 therefore presents a value of "0" on signal group CP_torder_m.

Although not shown, what should be appreciated from the above is that out-of-order data transfers are independently tracked by the coprocessor interface 712 of the present invention, for each coprocessor 710 that is coupled to CPU 702, and for each issue group within each coprocessor 710.

From Coprocessor Data Transfer

The coprocessor interface 712 of the present invention transfers data from the coprocessor 710 to the CPU 702 after a From coprocessor data transfer instruction has been dispatched. Only From transfer instructions utilize this transfer. The CPU 702 must have available buffers to allow the transfer to occur in the cycle after dispatch. The coprocessor interface 712 allows out-of-order transfer of data similar to that described above with reference to To coprocessor data transfers.

Figure 9:
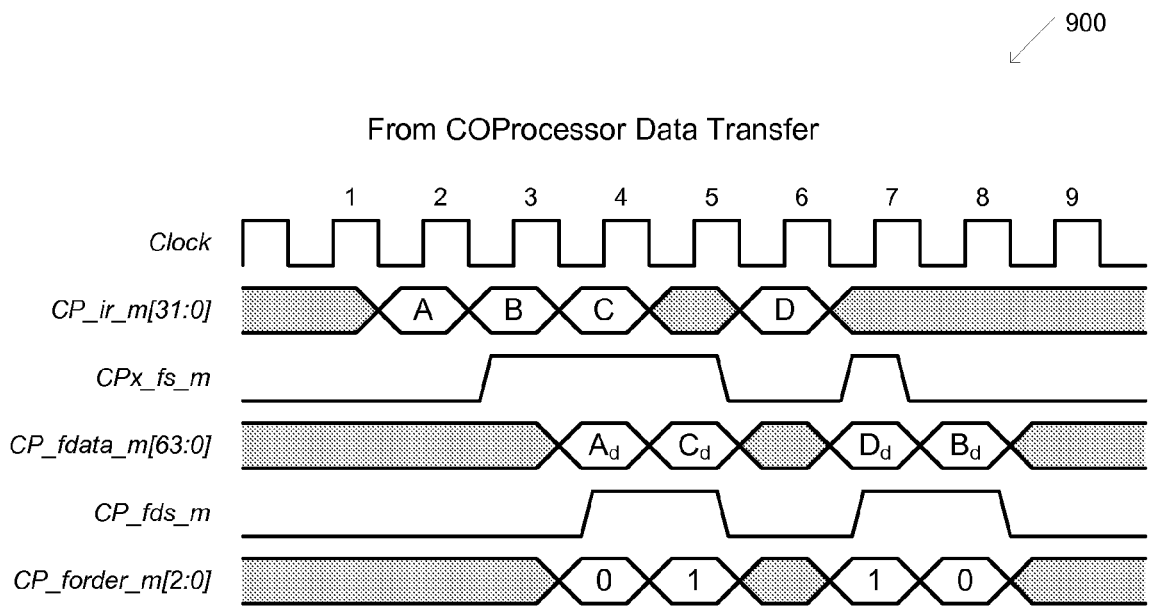
FIG. 9 is a timing diagram illustrating how data is transferred from a coprocessor to a CPU utilizing the coprocessor interface of the present invention.

Referring now to FIG. 9, a timing diagram 900 is shown illustrating the out-of-order data tracking mechanism associated with From coprocessor data transfer instructions, according to the coprocessor interface 712 of the present invention.

During clock cycles 2–4, and 6, From data transfer instructions A, B, C, and D are dispatched by the CPU 702 to the coprocessor 710. During clock cycles 3–5, and 7, instructions A–D are transferred to coprocessor 710.

During clock cycle 4, data associated with instruction A is presented by the coprocessor 710 to the CPU 702 via signal group CP_fdata_m. The data transfer is completed by assertion of strobe signal CPx_fds_m during the same clock cycle. At this point, the data being presented corresponds to data instruction A, which is the oldest outstanding From data transfer. Therefore, the relative order of the data is provided by the coprocessor interface 712 within the coprocessor 710, indicated on signal group CP_forder_m as "0".

During clock cycle 5, data associated with instruction C is presented by the coprocessor 710 to the CPU 702. The data transfer is completed by assertion of strobe signal CP_fds_m during the same cycle. At this point, the data being presented corresponds to instruction C, which is the $2^{nd}$ oldest outstanding From data transfer, B data being the oldest. Therefore, the relative order of the data is provided by the coprocessor interface 712 within the coprocessor 710, indicated on signal group CP_forder_m as "1".

During clock cycle 7, data associated with instruction D is presented by the coprocessor 710 to the CPU 702. The data transfer is completed by assertion of strobe signal CP_fds_m during the same cycle. At this point, the data being presented corresponds to instruction D, which is the $2^{nd}$ oldest outstanding From data transfer, B being the oldest. Therefore, the relative order of the data is provided by the coprocessor interface 712 within the coprocessor 710, indicated on signal group CP_forder_m as "1".

During clock cycle 8, data associated with instruction B is presented by the coprocessor 710 to the CPU 702. The data transfer is completed by assertion of strobe signal CP_fds_m during the same cycle. At this point, the data being presented corresponds to instruction B, which is the oldest outstanding From data transfer. Therefore, the relative order of the data is provided by the coprocessor interface 712 within the coprocessor 710, indicated on signal group CP_forder_m as "0".

Although not shown, what should be appreciated from the above is that out-of-order data transfers are independently tracked by the coprocessor interface 712 of the present invention, for each coprocessor 710 that is coupled to CPU 702, and for each issue group within each coprocessor 710.

Condition Code Checking

The coprocessor interface of the present invention provides signals for transferring the result of a condition code check from the coprocessor to the CPU. The instructions that typically utilize condition codes include branch instructions and conditional move instructions. When these instructions are decoded by the CPU, they are dispatched to both the CPU and to the coprocessor.

Table 3 below provides a brief summary of the condition code check signals that are provided within the COP interface of the present invention. Illustration of how these signals operate will be further described below with reference to FIGS. 10–11.

TABLE 3

| Signal Name | Dir | Issue Group | Description |
| --- | --- | --- | --- |
| CP_cccs_m | In | Comb, Arith | Coprocessor Condition Code Check Strobe. Asserted when condition code check results are available on CP_ccc_m. |
| CP_ccc_m | In | Comb, Arith | Coprocessor Condition Code Check. Valid when CP_cccs_m is asserted. When asserted, the instruction checking the condition code should proceed with its execution (i.e., branch or move data). When deasserted, the instruction should not execute its conditional operation (i.e., do not branch and do not move data) |

For some instructions that are dispatched, a result is sent from the coprocessor to the CPU that indicates whether or not the CPU should execute that instruction. For branches, the coprocessor tells the CPU whether or not to branch. For example, a conditional branch executing in the CPU might require the evaluation of an operation whose operands occur within the coprocessor. In this instance, the evaluation of the operation is performed entirely within the coprocessor, and providing the final condition codes to the CPU, rather than transferring the operands from the coprocessor to the CPU, and evaluating the result in the CPU.

In the same way, if a conditional move instruction requires evaluation of an operation whose operands occur within the coprocessor, rather than transferring the operands from the coprocessor to the CPU, and then evaluating the result, evaluation of the operation is performed entirely within the coprocessor. That is, for conditional moves, the coprocessor tells the CPU whether or not to execute the move instruction.

Thus, within the coprocessor interface of the present invention, it is the coprocessor that interprets certain conditional branch and conditional move instructions, and decides whether or not the CPU should execute them. Since evaluation of CPU branch and conditional move instructions are performed in the coprocessor, user-defined Boolean conditional operations are possible for conditional branch, and conditional move instructions, i.e., they need not be fixed apriori by the integer core.

Figure 10:
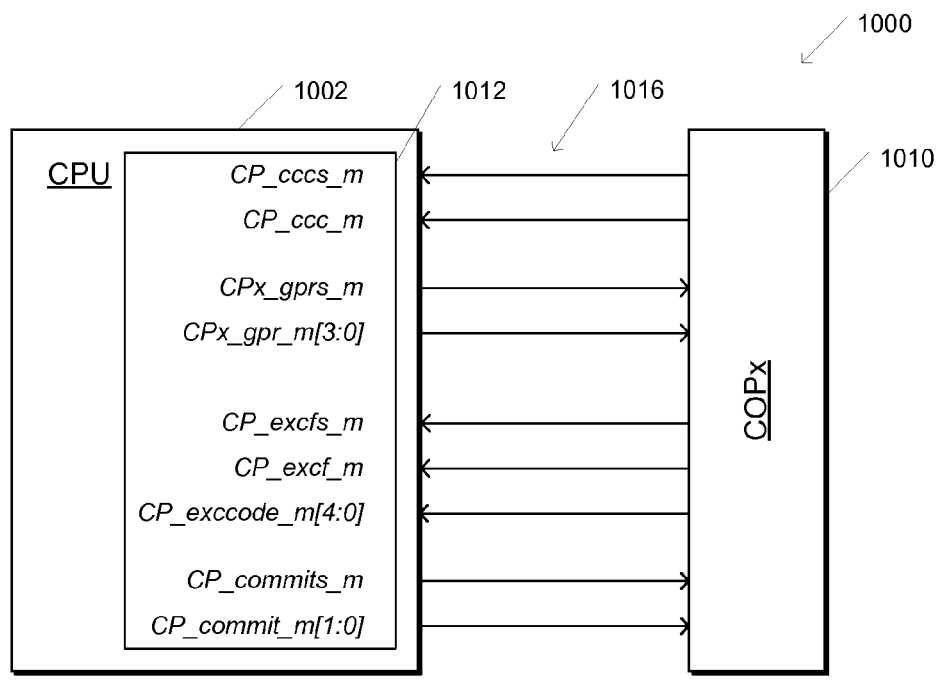
FIG. 10 is a block diagram illustrating coprocessor interface signals for: 1) coprocessor condition code checks; 2) CPU general purpose register values; 3) exception signal from a coprocessor to the CPU; and 4) instructions commit signaling from a CPU to a coprocessor, according to the present invention.

Referring now to FIG. 10, a block diagram 1000 is provided that illustrates the condition code signals 1016 transmitted by a coprocessor 1010 to a CPU 1002 via a coprocessor interface 1012. Operation of the condition code signals will now be described with reference to FIG. 11, to which attention is now directed.

Figure 11:
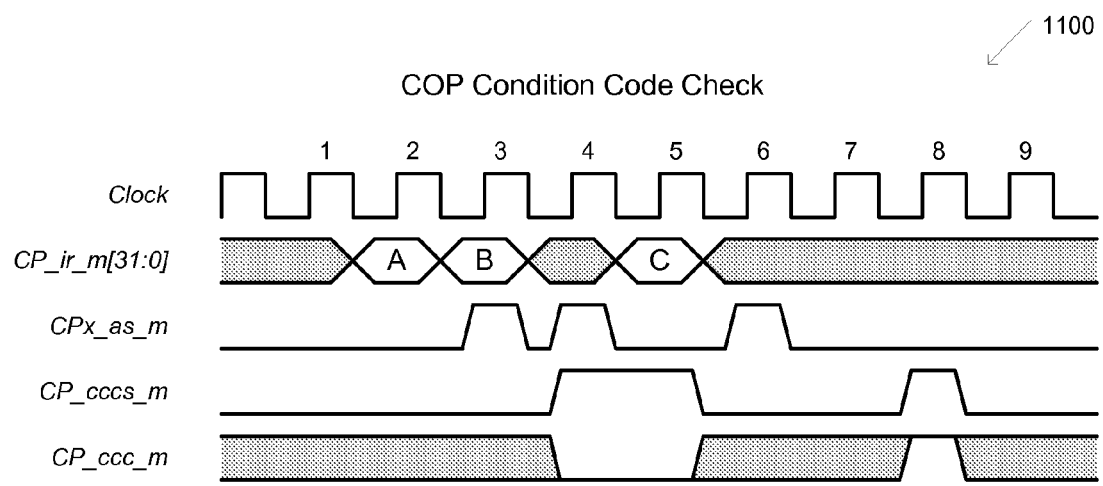
FIG. 11 is a timing diagram illustrating how a coprocessor responds to a CPU with condition code checks, according to the present invention.

FIG. 11 provides a timing diagram 1100 illustrating execution of three instructions, A, B, and C by the CPU 1002 and coprocessor 1010. Instruction A is dispatched by the CPU 1002 during clock cycle 2, and transfer is completed to the coprocessor 1010 by assertion of arithmetic strobe CPx_as_m during clock cycle 3. As mentioned above, instruction A also proceeds down the pipeline of the CPU 1002.

During clock cycle 4, the coprocessor interface 1012 of the coprocessor 1010 asserts the condition code strobe CP_cccs_m to indicate that the condition code resulting from evaluation of instruction A is available on condition code signal line CP_ccc_m. In this instance, CP_ccc_m is deasserted indicating to the CPU 1002 that it should not perform the operation specified by instruction A (either a conditional branch, or a conditional move operation).

Also during clock cycle 4, instruction B transfer is completed to the coprocessor 1010 by assertion of the arithmetic strobe CPx_as_m.

During clock cycle 5, the coprocessor interface 1012 of the coprocessor 1010 asserts the condition code strobe CP_cccs_m to indicate that the condition code resulting from evaluation of instruction B is available on condition code signal line CP_ccc_m. In this instance, CP_ccc_m is deasserted indicating to the CPU 1002 that it should not perform the operation specified by instruction B (either a conditional branch, or a conditional move operation). Also during clock cycle 5, instruction C is dispatched by the CPU 1002.

During clock cycle 6, instruction C transfer is completed to the coprocessor 1010 by assertion of the arithmetic strobe CPx_as_m.

During clock cycle 8, the coprocessor interface 1012 of the coprocessor 1010 asserts the condition code strobe CP_cccs_m to indicate that the condition code resulting from evaluation of instruction C is available on condition code signal line CP_ccc_m. In this instance, CP_ccc_m is asserted indicating to the CPU 1002 that it should perform the operation specified by instruction C (either a conditional branch, or a conditional move operation).

Although not shown, it should be appreciated the "_m" suffix on the condition code signal lines indicate that condition codes exist for each issue group within a coprocessor's interface.

GPR Data

The coprocessor interface of the present invention provides signals for transferring the results of a check on a register within the CPU 1002 to the coprocessor 1010, for particular coprocessor instructions. These instructions include the MOVN.fmt and MOVZ.fmt instructions of the MIPS Instruction Set Architecture (ISA). Other instructions supported include the ALNV.PS and ALNV.fmt instructions. When these instructions are dispatched to the coprocessor 1010, they are also dispatched to the CPU 1002.

Table 4 below provides a brief summary of the GPR signals that are provided within the COP interface of the present invention.

TABLE 4

| Signal Name | Dir | Issue Group | Description |
|---|---|---|---|
| CPx_gprs_m | Out | Comb, Arith | GPR Strobe. Asserted when additional general-purpose register information is available on CPx_gpr_m. |
| CPx_gpr_m[3:0] | Out | Comb, Arith | GPR Data. Supplies additional data from the CPU general purpose register file. CPx_gpr_m[2:0] is valid when CPx_gprs_m is asserted and only for ALNV.PS and ALNV.fmt instructions. CPx_pgr_m[3] is valid when CPx_gprs_m is asserted and only for MOVN.fmt and MOVZ.fmt instructions. |
| | | CPx_gpr_m[2:0] | RS (Valid only for ALNV.PS, ALNV.fmt) |
| | | Binary encoded | Lower 3bits of RS register contents |
| | | CPx_gpr_m[3] | RT Zero Check (Valid only for MOVN.fmt, MOVZ.fmt) |
| | | 0 | RT!=0 |
| | | 1 | RT==0 |

Coprocessor Exception Found

The coprocessor interface of the present invention provides signals for transferring exception information from the coprocessor to the CPU. The exception found transfer is used to signal whether an instruction caused an exception in the coprocessor 1010, or not.

When a coprocessor instruction causes an exception, the coprocessor 1010 signals this to the CPU 1002 so that it can start execution from the exception vector.

Table 5 below provides a brief summary of the exception found signals that are provided within the COP interface of the present invention. Illustration of how these signals operate will be further described below with reference to FIGS. 10 and 12.

TABLE 5

| Signal Name | Dir | Issue Group | Description |
|---|---|---|---|
| CP_excfs_m | In | Comb, Arith, TF | Coprocessor Exception Found Strobe. Asserted when coprocessor exception signaling is available on CP_excf_m. |

TABLE 5-continued

| Signal Name | Dir | Issue Group | Description |
|---|---|---|---|
| CP_excf_m | In | Comb, Arith, TF | Coprocessor Exception Found. When deasserted, the coprocessor is not causing an exception. When asserted, signifies that the coprocessor is causing an exception. The type of exception is encoded on the signal CP_exccode_m[4:0]. Valid when CP_excfs_m is asserted. |
| CP_exccode_m[4:0] | In | Comb, Arith, TF | Coprocessor Exception Code. Valid when CP_excfs_m is asserted and CP_excf_m is asserted.<br><br>CP_exccode_m     Exception<br>5'b01010     Reserved Instruction Exception<br>5'b01111     Floating Point Exception<br>5'b10000     Available for implementation specific use<br>5'b10001     Available for implementation specific use<br>5'b10010     COP2 Exception<br>Other values     Reserved. |

Figure 12:
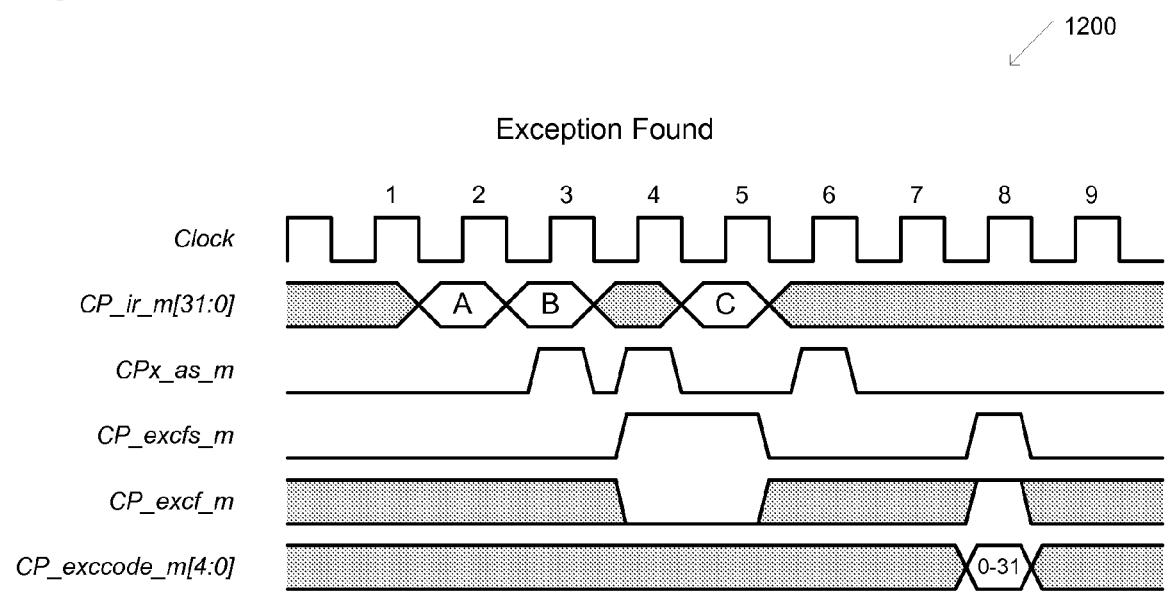
FIG. 12 is a timing diagram illustrating exception handling between a CPU and a coprocessor utilizing the coprocessor interface of the present invention.

Referring now to FIG. 12, a timing diagram 1200 is shown illustrating the exception found signal generation provided by the coprocessor interface 1012 of the present invention.

Arithmetic instructions are dispatched by the CPU 1002 during clock cycles 2, 3 and 5. These instructions are transferred to the coprocessor 1010 by assertion of the arithmetic strobe signal CPx_as_m during clock cycles 3, 4 and 6, respectively.

For each of the instructions A, B, and C, exception found signals must be generated by the coprocessor 1010 to inform the CPU 1002 either that no exception occurred for the instruction, or that an exception occurred, along with an indication of the type of exception.

During clock cycle 4, the coprocessor interface 1012 within the coprocessor 1010 asserts exception found strobe CP_excfs_m to indicate that a coprocessor exception signal is available on CP_excf_m.

Also during clock cycle 4, the exception signal CP_excf_m is deasserted, thereby indicating that the oldest instruction for which an exception found signal has not been seen, in this case instruction A, did not generate an exception.

During clock cycle 5, the coprocessor interface 1012 within the coprocessor 1010 continues to assert exception found strobe CP_excfs_m to indicate that a coprocessor exception found signal is available on CP_excf_m.

Also during clock cycle 5, the exception signal CP_excf_m is deasserted, thereby indicating that the oldest instruction for which an exception found signal has not been seen, in this case instruction B, did not generate an exception.

During clock cycle 8, the coprocessor interface 1012 within the coprocessor 1010 asserts exception found strobe CP_excfs_m to indicate that a coprocessor exception found signal is available on CP_excf_m.

Also during clock cycle 8, the exception signal CP_excf_m is asserted, indicating that the oldest instruction for which an exception found signal has not been seen, in this case instruction C, did generate an exception.

Furthermore, the coprocessor interface 1012 within the coprocessor 1010 generates an exception code on the signal group CP_exccode_m[4:0], to indicate to the CPU 1002 what type of exception was generated by instruction C in the coprocessor.

Instruction Commit

The coprocessor interface of the present invention provides signals for notifying the coprocessor when instructions can or cannot commit state. All instructions dispatched utilize this transfer so that the coprocessor knows when it can writeback results for the instruction.

Table 6 below provides a brief summary of the instruction commit signals that are provided within the COP interface of the present invention. Illustration of how these signals operate will be further described below with reference to FIGS. 10 and 13.

TABLE 6

| Signal Name | Dir | Issue Group | Description |
|---|---|---|---|
| CP_commits_m | Out | Comb, Arith, TF | Coprocessor Commit Strobe. Asserted when commit signaling is available on CP_commit_m. |
| CP_commit_m[1:0] | Out | Comb, Arith, TF | Commit Coprocessor Instruction. Valid when CP_commits_m is asserted.<br><br>CP_commit_m[1:0]     Type of Commit/Kill<br>2'b00     Instruction is not killed and can commit its results<br>2'b01     <br>2'b10     Instruction is killed. (not due to CP_excf_m)<br>2'b11     Instruction is killed (due to CP_excf_m) |

Due to a variety of exceptional conditions, any instruction may need to be killed. The CPU 1002 contains logic that tells the coprocessor interface 1012 within the CPU 1002 when to commit or kill coprocessor instructions.

Occasionally, a coprocessor instruction will be killed because of a coprocessor signaled exception. For example, if a floating point instruction is killed because of a floating point exception, the coprocessor must update exception status bits in the coprocessor's status register. On the other hand, if that same instruction was killed because of a higher-priority exception, those status bits must not be updated. For this reason, as part of the commit when signaling a kill, the CPU 1002 tells the coprocessor if the instruction was killed due to a coprocessor signaled exception or not.

When a coprocessor arithmetic instruction is killed, all subsequent arithmetic instructions and To/From coprocessor data transfer instructions that have been dispatched are also killed. This is necessary because the killed instruction(s) may affect the operation of subsequent instructions. In the cycle in which an instruction is killed, other transfers may occur, but after that cycle, no further transfers occur for any of the killed instructions. A side-effect of this is that instructions subsequent to a killed instruction do not have a commit transfer of their own. In effect, they are immediately killed and thus their remaining transfers cannot be sent, including their own commit transfer. Previously nullified instructions do not have a commit transfer either, because once nullified, no further transfers occur for that instruction.

Figure 13:
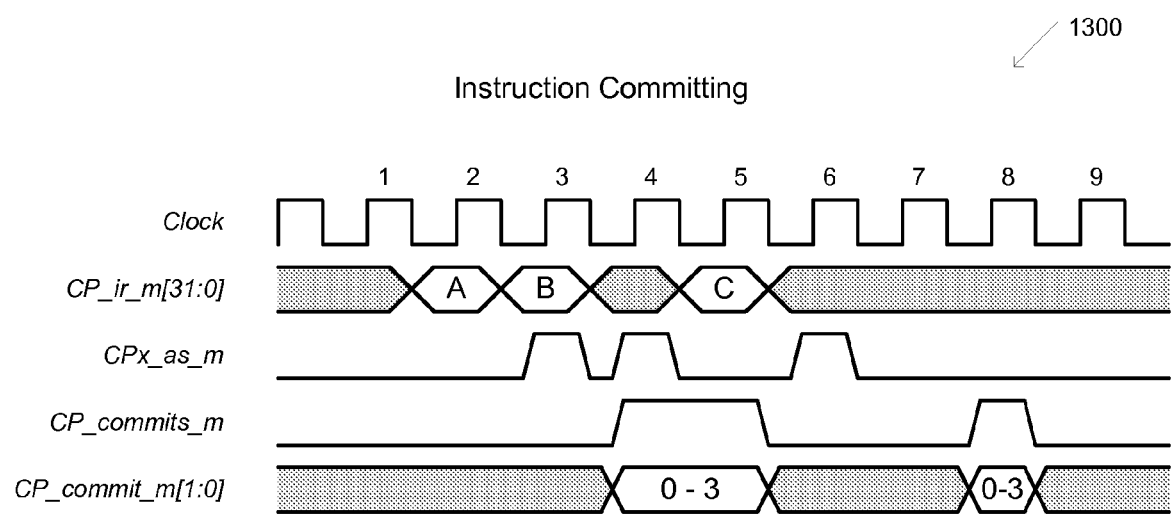
FIG. 13 is a timing diagram illustrating an instruction commit procedure by a CPU coupled to a coprocessor utilizing the coprocessor interface of the present invention.

Referring to FIG. 13, a timing diagram 1300 is provided to particularly illustrate the instruction commit mechanism in the coprocessor interface of the present invention. Arithmetic instructions A, B, and C are dispatched by the CPU 1002 in clock cycles 2, 3, and 5, respectively. These instruction transfers are completed by the processor 1002 by assertion of the arithmetic strobe CPx_as_m during clock cycles 3, 4, and 6, respectively. Instruction commit information is then required for each of the instructions before the coprocessor is allowed to commit state.

During clock cycle 4, the commit strobe signal CP_commits_m is asserted by the coprocessor interface 1012 within the CPU 1002. This signal indicates that commit signaling is available on signal group CP_commit_m. Also during clock cycle 4, commit information is presented on signal group CP_commit_m by the coprocessor interface 1012 within the CPU 1002. The commit information presented on signal group CP_commit_m corresponds to the oldest instruction for which commit information has not yet been presented. In this case, the commit information corresponds to arithmetic instruction A.

In cycles 5 and 8, commit information associated with instructions B and C is presented on signal group CP_commit_m. Depending on the values presented on the signal group by the coprocessor interface 1012, the coprocessor 1010 will either commit or kill the associated instruction, according to the signal values shown in Table 6.

Miscellaneous Interface Signals

Table 7 below provides operational information relating to coprocessor interface signals that have not yet been discussed, but whose understanding is not enhanced by reference to a timing diagram.

TABLE 7

| Signal Name | Dir | Issue Group | Description |
| --- | --- | --- | --- |
| CP_reset | Out | None | Coprocessor Reset. Asserted when a hard or soft reset is performed by the CPU. At a minimum, this signal will be asserted for 1 cycle. |
| CP_idle | In | None | Coprocessor Idle. Asserted when the coprocessor logic is idle. Enables the integer processor core to go into sleep mode and shut down the internal integer processor core clock. Valid only if CP1_fppresent, CP1_mdmxpresent, or CPx_present is asserted. |
| CP_tx32 | SIn | None | Coprocessor 32bit Transfers. When asserted, the integer unit must cause an RI exception for 64bit TF instructions. Furthermore, when asserted, CP1_fppresent and CP1_mdmxpresent are ignored and internally deasserted. This forces CP_tx32 to only be used for COP2. This is a static input and must always be valid. |
| CP1_fppresent | Sin | None | Coprocessor FPU Present. Must be asserted when FPU hardware is connected to the coprocessor interface. |
| CP1_mdmxpresent | Sin | None | Coprocessor MDMX Present. Must be asserted when MDMX hardware is connected to the coprocessor interface. |
| CPx_present | Sin | None | Coprocessor Present. Must be asserted when coprocessor hardware is connected to the coprocessor interface. |
| CP_irenable_m | Out | Comb, Arith, TF | Enable Instruction Registering. When deasserted, no instruction strobes will be asserted in the following cycle. When asserted, there may be an instruction strobe asserted in the following cycle. Instruction strobes include CPx_as_m, CPx_ts_m, CPx_fs_m. |
| CP_adisable_m | Sin | Comb, Arith | Inhibit Arithmetic Dispatch. When asserted, prevents the CPU from dispatching an arithmetic instruction using this issue group. |
| CP_tfdisable_m | Sin | Comb, TF | Inhibit To/From Dispatch. When asserted, prevents the CPU from dispatching a To/From instruction using this issue group. |

TABLE 7-continued

| Signal Name | Dir | Issue Group | Description |
| --- | --- | --- | --- |
| CP_inst32_m | Out | Comb, Arith, TF | MIPS32 Compatibility Mode - Instructions. When asserted, the dispatched instruction is restricted to the MIPS32 subset of instructions. Please refer to the MIPS64 architecture specification available from MIPS Technologies, Inc. for a complete description of MIPS32 compatibility mode. Valid the cycle before CPx_as_m, CPx_fs_m, or CPx_ts_m is asserted. |
| CP_fr32_m | Out | Comb, Arith, TF | MIPS32 Compatibility Mode - Registers. When asserted, the dispatched instruction uses the MIPS32 compatible register file. Valid the cycle before CPx_as_m, CPx_ts_m, or CPx_fs_m is asserted. |
| CP_endian_m | Out | Comb, Arith, TF | Big Endian Byte Ordering. When asserted, the processor is using big endian byte ordering for the dispatched instruction. When deasserted, the processor is using little-endian byte ordering. Valid the cycle before CPx_as_m, CPx_ts_m, or CPx_fs_m is asserted. |

Various Issue Group Configurations

A CPU that supports only single-issue integer instructions may implement a single combined issue group that can issue any type of instruction as follows:

The issue group will be 0 (m=0).

CP_adisable_0 and CP_tfdisable_0 may not be implemented. Since this is the only issue group, these instructions can never be disabled.

CP_order_0[2:0] may not be implemented. Since there is only one issue group, dispatch order is not needed.

An integer core with this configuration can be used with a coprocessor with more issue groups. In this case, the Combined issue group of the coprocessor is connected to the combined issue group of the integer processor core and the other issue groups of the coprocessor are tied inactive.

An integer processor core that supports limited dual issue supports dual-issue of instructions only when one is an arithmetic coprocessor instruction and the other is a To/From coprocessor instruction. With this option, two issue groups will be implemented—one combined (issue group 0) and one arithmetic (issue group 1).

An integer core that supports full dual issue supports all the cases of limited dual issue, plus it can issue two arithmetic instructions or two To/From instructions. With this option, two combined issue groups will be implemented.

A single-issue coprocessor can be used with a dual-issue integer processor core by simply connecting the combined issue groups together and asserting CP_adisable_1 and CP tfdisable_1 for the 2$^{nd}$ combined issue group of the integer processor core.

A limited dual-issue coprocessor can be used with a dual-issue integer processor core by connecting the coprocessor combined issue group to one of the integer processor core's combined issue groups and asserting CP_adisable_m for that issue group. Then, connect the coprocessor's arithmetic issue group to the remaining combined issue group of the integer processor core and assert CP_tfdisable_m for that issue group.

Although the present invention and its objects, features, and advantages have been described in detail, other embodiments are encompassed by the invention. In addition to implementations of the invention using hardware, the invention can be embodied in software disposed, for example, in a computer usable (e.g., readable) medium configured to store the software (i.e., a computer readable program code). The program code causes the enablement of the functions or fabrication, or both, of the invention disclosed herein. For example, this can be accomplished through the use of general programming languages (e.g., C, C++, etc.), hardware description languages (HDL) including Verilog HDL, VHDL, AHDL (Altera Hardware Description Language) and so on, or other programming and/or circuit (i.e., schematic) capture tools available in the art. The program code can be disposed in any known computer usable medium including semiconductor memory, magnetic disk, optical disc (e.g., CD-ROM, DVD-ROM, etc.) and as a computer data signal embodied in a computer usable (e.g., readable) transmission medium (e.g., carrier wave or any other medium including digital, optical or analog-based medium). As such, the code can be transmitted over communication networks including the Internet and intranets. It is understood that the functions accomplished and/or structure provided by the invention as described above can be represented in a core that is embodied in program code and may be transformed to hardware as part of the production of integrated circuits. Also, the invention may be embodied as a combination of hardware and software.

Furthermore, the particular illustrations used to describe the coprocessor interface of the present invention included a single CPU and a single coprocessor. However, as mentioned above, the coprocessor interface has been described to encompass connections between multiple CPU's and multiple coprocessors, any of which may have single issue pipelines, or multiple issue pipelines.

Also, although the coprocessor interface has been described with particular reference to MIPS32 and MIPS64 Instruction Set Architecture, one skilled in the art will appreciate that the scalability, and configurability of the interface is not limited to such architecture, nor is it limited to the data width of the instructions, and/or the data that is being transferred.

Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

We claim:

1. A coprocessor interface for establishing instruction, data, and control communication between a central processing unit (CPU) and a coprocessor, the interface providing for coprocessor evaluation of CPU conditional instructions, the interface comprising:
- an instruction transfer group for providing the CPU conditional instructions to the coprocessor; and
- a condition code check signal group, coupled to said instruction transfer group, for transferring condition code checkss from the coprocessor to the CPU upon evaluation of the CPU conditional instructions by the coprocessor.

2. The coprocessor interface as recited in claim 1 wherein the CPU, upon receipt of said condition code checks from the coprocessor, either executes, or does not execute, the CPU conditional instructions, based on the value of said condition code checks.

3. The coprocessor interface as recited in claim 1 wherein said condition code checks signal the CPU to either execute, or not execute, the CPU conditional instructions.

\* \* \* \* \*